United States Patent
Polak

(10) Patent No.: US 6,226,627 B1
(45) Date of Patent: May 1, 2001

(54) METHOD AND SYSTEM FOR CONSTRUCTING ADAPTIVE AND RESILIENT SOFTWARE

(75) Inventor: Wolfgang H. Polak, Sunnyvale, CA (US)

(73) Assignees: Fuji Xerox Co., Ltd., Tokyo (JP); Xerox Corporation, Stamford, CT (US)

(*) Notice: Subject to any disclaimer, the term of this patent is extended or adjusted under 35 U.S.C. 154(b) by 0 days.

(21) Appl. No.: 09/061,890

(22) Filed: Apr. 17, 1998

(51) Int. Cl.[7] .................................................. G06F 15/18
(52) U.S. Cl. ................................. 706/14; 706/16; 706/47
(58) Field of Search .............................. 706/14, 15, 16, 706/19, 21, 47; 704/9, 10; 717/19

(56) References Cited

U.S. PATENT DOCUMENTS

| | | | |
|---|---|---|---|
| 4,916,625 | * | 4/1990 | Davidson et al. ................... 700/139 |
| 5,140,671 | * | 8/1992 | Hayes et al. ............................ 706/60 |
| 5,167,012 | * | 11/1992 | Hayes et al. ............................ 706/60 |
| 5,325,518 | * | 6/1994 | Bianchini, Jr. ......................... 714/31 |
| 5,428,791 | * | 6/1995 | Andrew et al. ....................... 395/703 |
| 5,440,726 | | 8/1995 | Fuchs et al. ........................... 714/20 |

(List continued on next page.)

OTHER PUBLICATIONS

Mahlet et al, "integrating confoguration management into generic environment", ACM, pp. 229–237, 1990.*

Mitchell, "Performance analysis of a fault tolerent computer system", Proc. of the ACM measur & modeling of comp. syys, pp. 249–250, May 1990.*

Jezequel, "Reifying vriants in configuration management", ACM trans of software eng. & meth. vol. 8, No. 3, pp. 284–295, Jul. 1999.*

Heimbigner, "A graph transform model for configuration management environments", ACM pp. 216–225, 1990.*

Sidhu et al, "String matching on multicontext FPGAs using self reconfiguration", FPGA ACM pp. 217–226, 1999.*

(List continued on next page.)

*Primary Examiner*—Mark Powell
*Assistant Examiner*—Anil Khatri
(74) *Attorney, Agent, or Firm*—Oliff & Berridge, PLC

(57) ABSTRACT

A dependency action system uses redundant sets of dynamically reconfigurable functional components to achieve robustness and fault tolerance, and to achieve self-optimization by learning and planning techniques that use time-stamps and or computation stamps as a key indicator. The dependency action system is based on functional components, or actions, which act on data values that are stored in stamped storage locations. Data is read and written to these storage locations, updating the stamps as appropriate. The execution of an action is controlled by the stamps of its enabling and disabling storage locations. The dependency action system specifies an action as enabled if new data has arrived in the enabling storage locations. Updating the stamp of the disabling storage locations disables the action. If an alternative action succeeds and produces a value, the other alternative actions become disabled. If one action fails to produce a value to a storage location, other alternative actions may still be enabled and can be executed. Thus, the dependency action system supports automatic recovery from failure of an individual action. The dependency action system accumulates statistical information about the behavior of the actions, which includes the probability that a particular disabling storage location will be updated by an action and the average cost of an action. The dependency action system uses this information to plan a sequence of action executions that most likely leads to the cheapest solution of a given task.

33 Claims, 17 Drawing Sheets

U.S. PATENT DOCUMENTS

| | | | |
|---|---|---|---|
| 5,515,524 | * 5/1996 | Lynch et al. | 395/500.34 |
| 5,530,802 | 6/1996 | Fuchs et al. | 714/17 |
| 5,581,664 | * 12/1996 | Allen et al. | 706/46 |
| 5,586,219 | * 12/1996 | Yufik | 706/14 |
| 5,615,308 | * 3/1997 | Ando et al. | 706/48 |
| 5,634,058 | * 5/1997 | Allen et al. | 395/712 |
| 5,684,807 | * 11/1997 | Bianchini et al. | 714/712 |
| 5,715,371 | * 2/1998 | Ahamed et al. | 706/10 |
| 5,748,847 | * 5/1998 | Lo | 706/14 |
| 5,751,914 | * 5/1998 | Coley et al. | 706/47 |
| 5,806,021 | * 9/1998 | Chen et al. | 704/9 |
| 5,950,011 | * 9/1999 | Albrech et al. | 395/712 |
| 5,987,444 | * 11/1999 | Lo | 706/45 |

OTHER PUBLICATIONS

Holzle et al, "Optimizing dynamically dispatched calls with run time feedback", SIGPLAN ACM pp. 326–336, 1994.*

Skomorokhov et al, "Adaptive learning networks in APL2", ACM Quote Quad, pp. 219–229, 1993.*

Crow et al, "The role of built knowledge in adaptive interface systems", IUI ACM pp. 97–104, 1999.*

Hannan, "Searching for semantics", ACM PEMP, pp. 1–12. Jan. 1993.*

Hopfiled et al, "Neural computation of decisions in optimization problems", Biological Cybernetics, pp. 141–152, 1985.*

J. Herath, et al., "Data Flow Computing," *In Parallel Algorithms and Architectures*; Springer–Verlag, NY, NY, 1987, pp. 25–36.

P. Ammann et al., "Data Diversity: An Approach to Software Fault Tolerance," *IEEE Transactions on Computer*, vol. 37, No. 4, Apr. 1988, pp. 418–425.

P. Lee "A Reconsideration of the Recovery Block Scheme," *The Computer Journal*, vol. 21, No. 4, 1979, pp. 306–310.

D. Eckhardt et al., "An Experimental Evaluation of Software Redundancy as a Strategy for Improving Reliability," *IEEE Transactions of Software Engineering*, vol. 17, No. 7, Jul. 1991, pp. 692–702.

J. Upadhyaya et al., "A Watchdog Processor Based General Rollback Technique with Multiple Retries," *IEEE Transactions on Software Engineering*, vol. SE–12, No. 1, Jan. 1986, pp. 87–95.

N. Beebe et al.,"The Design of Gmake–An Extended Implementation of UNIX Make," *Technical Report*, Center for Scientific Computing and Dept. of Mathematics, University of Utah, Salt Lake City, Utah, Feb. 1990, pp. 1–34.

J. Kramer et al., "Dynamic Configuration for Distributed Systems," *IEEE Transactions on Software Engineering*, vol. SE–11, No. 4, Apr. 1985, pp. 424–436.

K. Marzullo et al., "Tools for Distributed Application Management," *Computer*, Aug. 1991, pp. 42–51.

* cited by examiner

FIG. 6
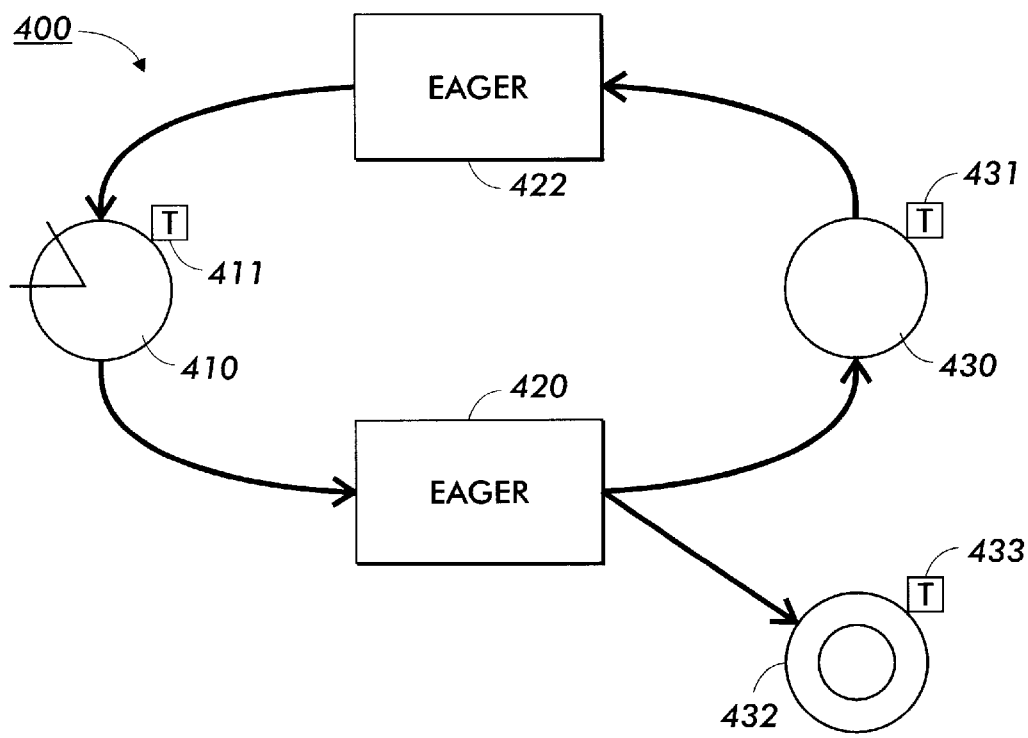
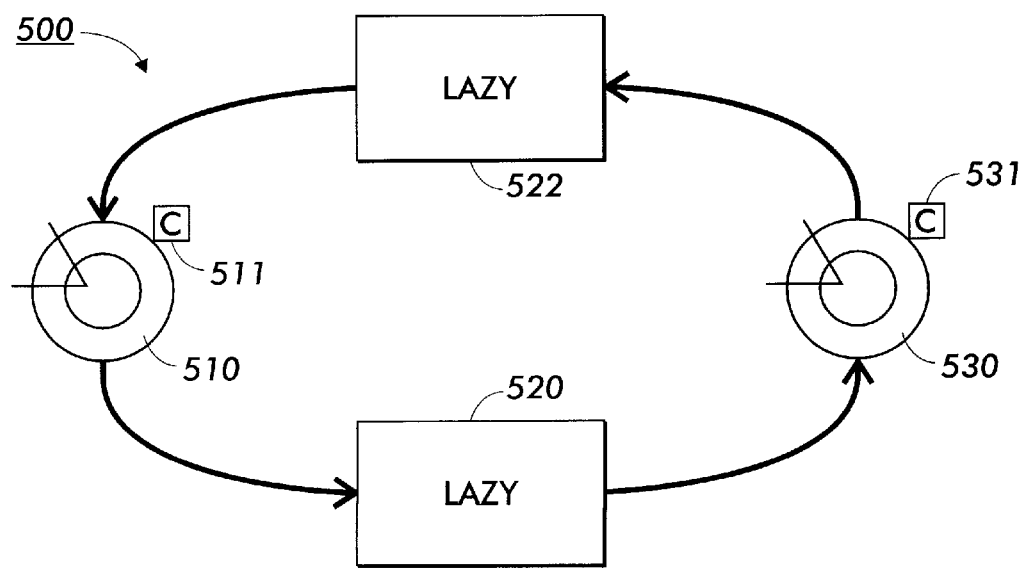
FIG. 7

| TIME | ENABLED ACTIONS | X | Y | OUT |
|---|---|---|---|---|
| 2 | Y<X?, <u>X<Y?</u>, OUT=X | 34 | 51 | |
| 3 | Y<X?, Y=Y−X, <u>OUT=X</u> | 34 | 51 | 34 |
| 4 | <u>Y<X?</u>, Y=Y−X | 34 | 51 | 34 |
| 5 | <u>Y=Y−X</u> | 34 | 17 | 34 |
| 6 | Y<X?, <u>X<Y?</u>, OUT=X | 34 | 17 | 34 |
| 7 | <u>Y<X?</u>, X=X−Y, OUT=X | 34 | 17 | 34 |
| 8 | <u>X=X−Y</u>, OUT=X | 17 | 17 | 34 |
| 9 | Y<X?, <u>X<Y?</u>, OUT=X | 17 | 17 | 34 |
| 10 | <u>Y<X?</u>, OUT=X | 17 | 17 | 34 |
| 11 | <u>OUT=X</u> | 17 | 17 | 17 |

METHOD AND SYSTEM FOR CONSTRUCTING ADAPTIVE AND RESILIENT SOFTWARE

BACKGROUND OF THE INVENTION

1. Field of Invention

This invention is directed to methods and systems for building and executing complex software. In particular, this invention relates to self-optimizing software employing learning and planning techniques. More specifically, this invention relates to software that tolerates outside interference and supports dynamic reconfiguration.

2. Description of Related Art

Traditional software systems tend to be rigid and fragile, in the sense that such software systems will fail when faced with problems, failures, or environmental situations that were not anticipated by the designer. Part of the reason that software systems fail is that algorithmic procedures tend to be instruction-sequenced and need to explicitly account for all possible contingencies. That is, if the design has not anticipated and accounted for an alternative, an occurrence of that alternative results in the software system failing. Some high-level language features, such as exception handling mechanisms and dynamic dispatching of object-oriented language modules, are designed to address the problem of instruction sequencing.

These problems relate to three basic technology areas, including (i) system building procedures and dynamic system configuration, (ii) software fault tolerance, and (iii) formal system descriptions and programming paradigms.

One approach to system building procedures and dynamic system configuration is discussed in Nelson H. F. Beede, "The Design of G Make- and Extended Implementation of UNIX Make", Technical report, Center for Scientific Computing and Department of Mathematics, University of Utah, Salt Lake City, Utah, Feb. 5, 1990, herein incorporated by reference in its entirety. Beede discusses the UNIX "make" utility as using time-stamps associated with files to derive the execution of tools that generate new files. A tool's execution is controlled by the time-stamps of that tool's inputs and outputs. This mechanism does not allow for redundancy. That is, if a tool fails, then a computation, e.g., a build-process, fails. The UNIX "make" utility does not, and because of the lack of redundancy need not, optimize its execution through planning. The "make" utility does not learn and does not allow iteration. Iteration in this instance refers to targets that directly or indirectly depend on themselves through successive iterations.

Another approach to system building procedures and dynamic system configuration is to achieve a reconfigurable system. For example, U.S. Pat. No. 5,634,058 to Allen et al. describes a method for dynamically loading software modules based on need. This method merely deals with the mechanics of loading modules, rather than deciding which of a set of alternative modules to load. The system described in U.S. Pat. No. 5,515,524 to Lynch et al. specifies and builds a software configuration based on structural descriptions, requirements, and constraints. The system is static in one sense because once constructed, the system's configuration cannot be altered while the system is running.

A more dynamic approach to software configuration is described by Kramer et al., "Dynamic Configuration for Distributed Systems", IEEE Transaction on Software Engineering, 11(4):424–436, 1985. This approach essentially provides the ability to modify and extend a system while it is running. A change in configuration is made explicitly by changing a configuration description, and is not automatically based on the given problem, failure, and cost, i.e., run-time, quality, etc., of the components. Accordingly, a configuration change does not occur "on the fly" as the system encounters problems, failures, and changing cost parameters of system components.

Another dynamic system reconfiguration is provided by Marzullo et al., "Tools for Distributed Application Management", Computer, 24(8):32–51, August, 1991. In contrast Kramer's system, Marzullo describes a system called Meta which realizes dynamic system reconfiguration. The Meta system changes its configuration while the system is running in response to problems, failures and changing cost parameters of system components that are encountered. Meta achieves this by using a separate monitoring process that observes and controls the execution of the actual program through sensors and actuators provided by its functional components. A monitoring program or sensors or actuators, is required and modification of control flow is not necessarily based on the time-ordering of changed data.

Software fault tolerance is also used to solve the problems of system failure and environmental situations that were not anticipated by the designer. The N-Version Version method disclosed in Eckhardt et al., "An Experimental Evaluation of Software Redundancy As a Strategy for Improving Reliability", IEEE Transactions on Software Engineering, 17(7), pages 692–702, 1991, produces highly reliable software systems by using multiple functional components that are independently developed for the same specification. The multiple functional components are executed concurrently and the system votes among the generated results. This method primarily deals with possible design and coding errors in independently developed components. The N-Version method uses only homogenous redundancy. That is, all components are intended to perform the same function. Additionally, all alternatives are executed; there is no dynamic selection of the components. Nor do N-version systems adapt or learn.

Other approaches to achieving software fault tolerance include different approaches for using recovery blocks, rollback, and re-execution. Such approaches are described in U.S. Pat. Nos. 5,530,802, and 5,440,726 to Fuchs et al. Generally, these methods make software more fault tolerant through the use of rollback and re-execution of failing software components. This will succeed if the fault is intermittent. If the fault is repeatable, Fuchs et al. discloses rearranging the input data in order to avoid the fault execution path. Such a system may attempt to re-execute a failing sequence of functions.

A Petri net is a formalism for describing concurrent systems and processes, as described in Reisig, "Petri Nets", Springer, Berlin, 1982. Petri nets have two kinds of nodes, data location nodes and transition, or action, nodes. Petri nets use tokens to determine when a transition can be executed. A token indicates the availability of data. A transition is executed when tokens are available on all input storage locations. Scheduling of transitions is determined by the tokens. A transition will consume all input tokens and will produce tokens on its output storage locations. Petri nets are a descriptive formalism rather than a method of computation and do not adapt or learn.

An alternative programming paradigm is the dataflow program. Execution of actions in dataflow programs are described in Herath et al., "Parallel Algorithms and Architectures", pp. 25–36, Springer-Verlag, New York, N.Y., 1987. Execution of actions in dataflow programs is triggered by the availability or arrival of input data. The execution of a node in a dataflow program is not controlled by the availability of data on the outputs, as it is in the present invention. Dataflow programs do not use redundancy.

SUMMARY OF THE INVENTION

These conventional methods fail to adequately address the problems incurred by rigid instruction sequencing. Such methodologies employ commonly understood functionality such as branching, looping, backtracking, and non-determinism, i.e., multiple functional components that are applicable to compute the same variable. Yet these methods are generally incapable of adapting to failure of individual functions, changing environmental conditions, such as, for example, interferences, computational resources, failure of devices, or mistakes by human users.

Thus, a data driven optimization calculation to keep track of a complex set of components and to enable or disable the members of various sequences by a simple expedient is needed.

This invention provides a method and apparatus for constructing and executing complex software.

This invention further provides a method and apparatus that uses redundant sets of functional components to achieve robustness and fault tolerance.

This invention also provides a method and apparatus employing a technique for composing functional components that tolerates outside interference and supports dynamic reconfiguration.

This invention further provides a method and apparatus that achieves self-optimization through the use of learning and planning techniques.

This invention provides a method and apparatus in which these features are realized through the use of time-stamps and appropriate execution rules.

Thus, the method and system of this invention combine the benefits of time-stamps, e.g., invariance to outside interference, with the benefits of general-purpose control structures embodied in the dependency action system of this invention.

These and other features and advantages of this invention are described in or are apparent form the following description of the preferred embodiments.

BRIEF DESCRIPTION OF THE DRAWINGS

The preferred embodiments of this invention will be described in detail, with reference to the following figures, wherein:

FIG. 6 illustrates an exemplary eager dependency action system;

FIG. 7 illustrates an exemplary lazy dependency action system;

Figure 11:
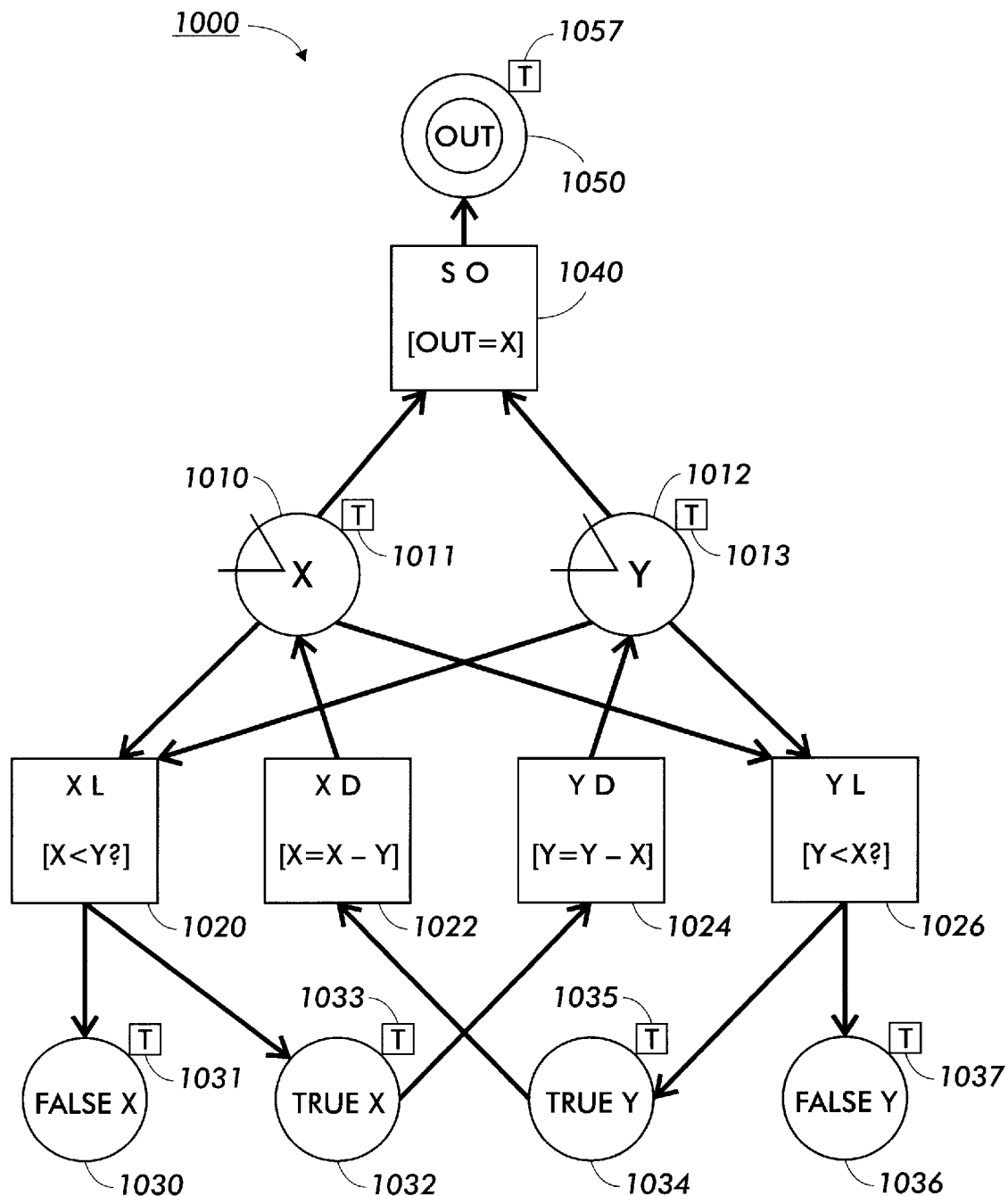
FIG. 11 is a block diagram illustration of a simple exemplary dependency action system that determines the greatest common divisor function.
Figure 19:
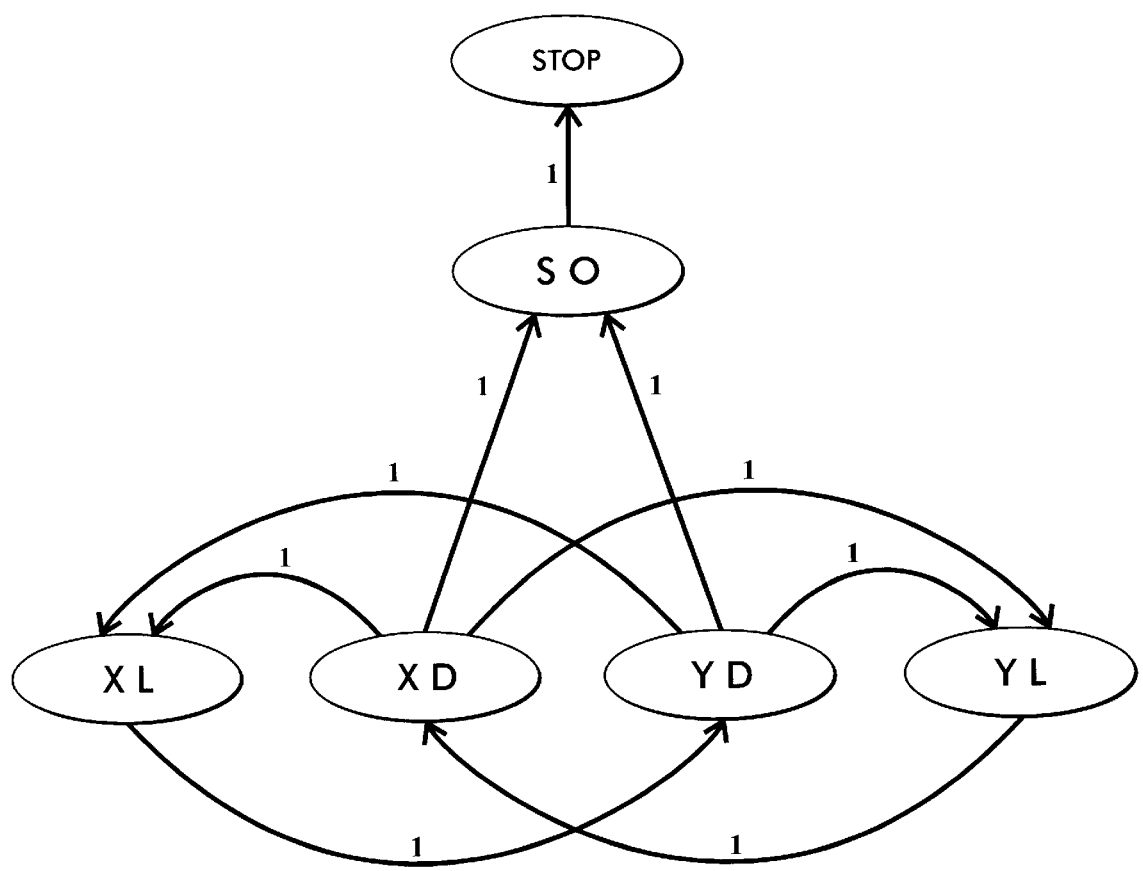
FIG. 19 is a directed graph associated with the exemplary dependency action system shown of FIG. 11 with weights based on Tables I and II.

Table I tabulates the cost and the eager/lazy characterization of the exemplary dependency action system of FIG. 11;

Table II tabulates the probability an action will modify a storage location of the exemplary dependency action system of FIG. 11;

Table III tabulates the minimum distance between nodes corresponding to the actions of FIG. 19;

Table IV tabulates the preference relation for actions of the exemplary dependency action system of FIG. 11.

DETAILED DESCRIPTION OF PREFERRED EMBODIMENTS

The method and system of this invention are derived from biological systems and organisms that achieve resilience and adaptability through redundant functional components, planning the use of these components to achieve a given task, and learning appropriateness of components from experience. Having redundant functional components not only means that there may be multiple instances or different implementations of the same logical function, termed homogenous redundancy, but, more importantly, redundant functionality includes combining different sets of functions in different ways to solve the same problem or to achieve the same overall behavior, termed heterogeneous redundancy.

The method and system of this invention employ both homogeneous and heterogeneous redundant functionality. As a result, the method and system of this invention are useful for constructing systems that adapt to changing requirements, to environmental conditions, and to outside interference. Applications include, but are not restricted to, systems with humans-in-the-loop and systems that control devices and processes that are subject to failure or unanticipated behavior.

The method and system of this invention are based on using time-stamps as a way to compose functional components. The method and system generalize the use of time-stamps in the Unix "Make" facility, as described in Beede. In contrast to the Unix Make facility, the method of the present invention is non-deterministic, in that it allows multiple functional components that are applicable to determine the same variable, although different outputs may be produced on different executions. In this method, dependencies between storage locations may be cyclic, leading to iteration. Termination is possible through the use of branching. Failure of a functional component does not imply failure of the whole computation. Instead, alternative functional components will be tried in order to determine the desired output. Thus, backtracking in response to failure is automatic, based on the enabling rules of the composition mechanism.

Figure 1:
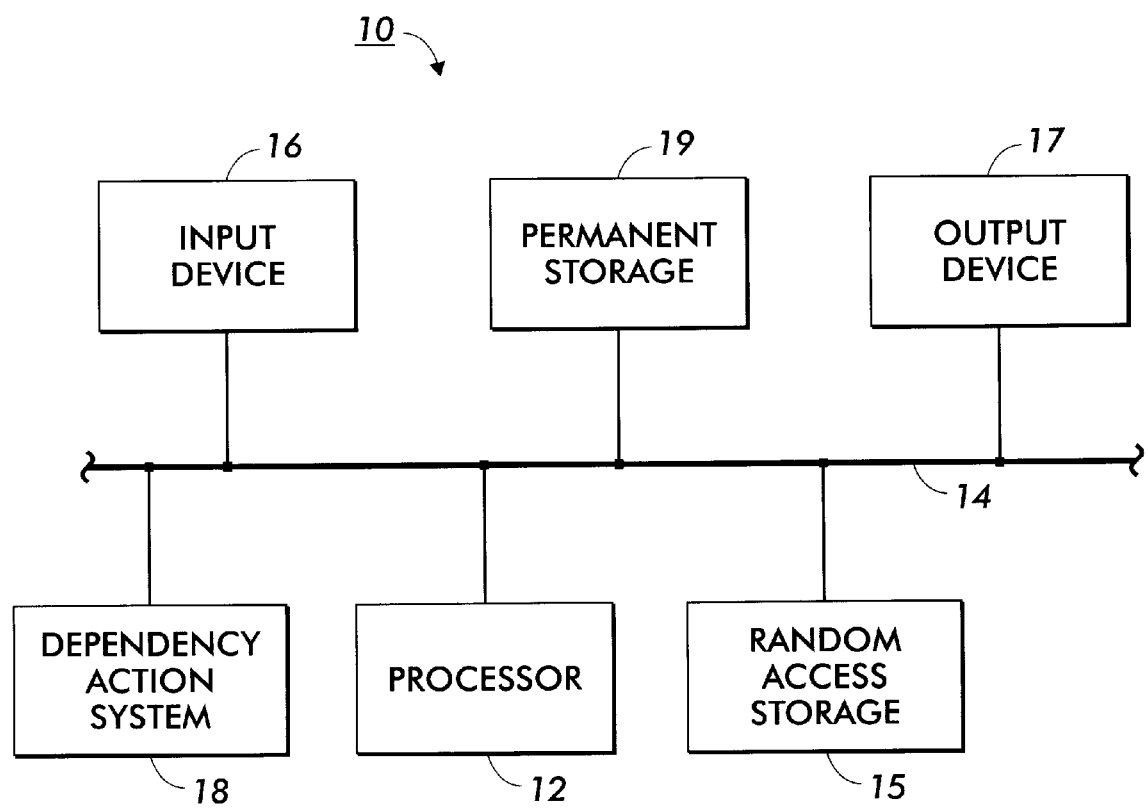
FIG. 1 is a block diagram of a system capable of implementing the dependency action system of this invention.

FIG. 1 illustrates a block diagram of the functional elements of a dependency action system according to this invention. The dependency action system 10 includes a processor 12 communicating over a link 14 with a storage or memory device 15, an input device 16, an output device 17 and a data structure 18 that stores the structural interrelationships of the different dependency action system processes or "actions". The storage device 19 stores the dependency action system parameters discussed in detail below. The processor 12 communicates with the input device 16 and receives commands from a user for operating the dependency action system 10. The input device 16 may comprise any number of conventional input devices, such as a mouse or a keyboard.

As shown in FIG. 1, the system 10 is preferably implemented using a programmed general purpose computer. However, the system 10 can also be implemented using a special purpose computer, a programmed microprocessor or microcontroller and any necessary peripheral integrated circuit elements, an ASIC or other integrated circuit, a hardwired electronic or logic circuit such as a discrete element circuit, a digital signal processor, a programmable logic device such as a PLD, PLA, FPGA or PAL, or the like. In general, the system 10 can be implemented on any device which is capable of implementing a finite state machine capable of implementing the flowcharts shown in FIGS. 10–16.

Additionally, as shown in FIG. 1, the storage or memory device 15 is preferably implemented using static or dynamic RAM. The permanent storage or memory device 19 is preferably implemented using a floppy disk and disk drive, a writable optical disk and disk drive, a hard drive, flash memory or the like. Additionally, it should be appreciated that the storage or memory device 15 and the permanent storage or memory device 19 can be either distinct portions of a single memory or physically distinct memories.

Further, it should be appreciated that the link 14 connecting the permanent storage or memory device 19 and the processor 12 can be a wired or wireless link to a network, not shown. The network can be a local area network, a wide area network, an intranet, the Internet or any other distributed processing storage network.

Figure 2:
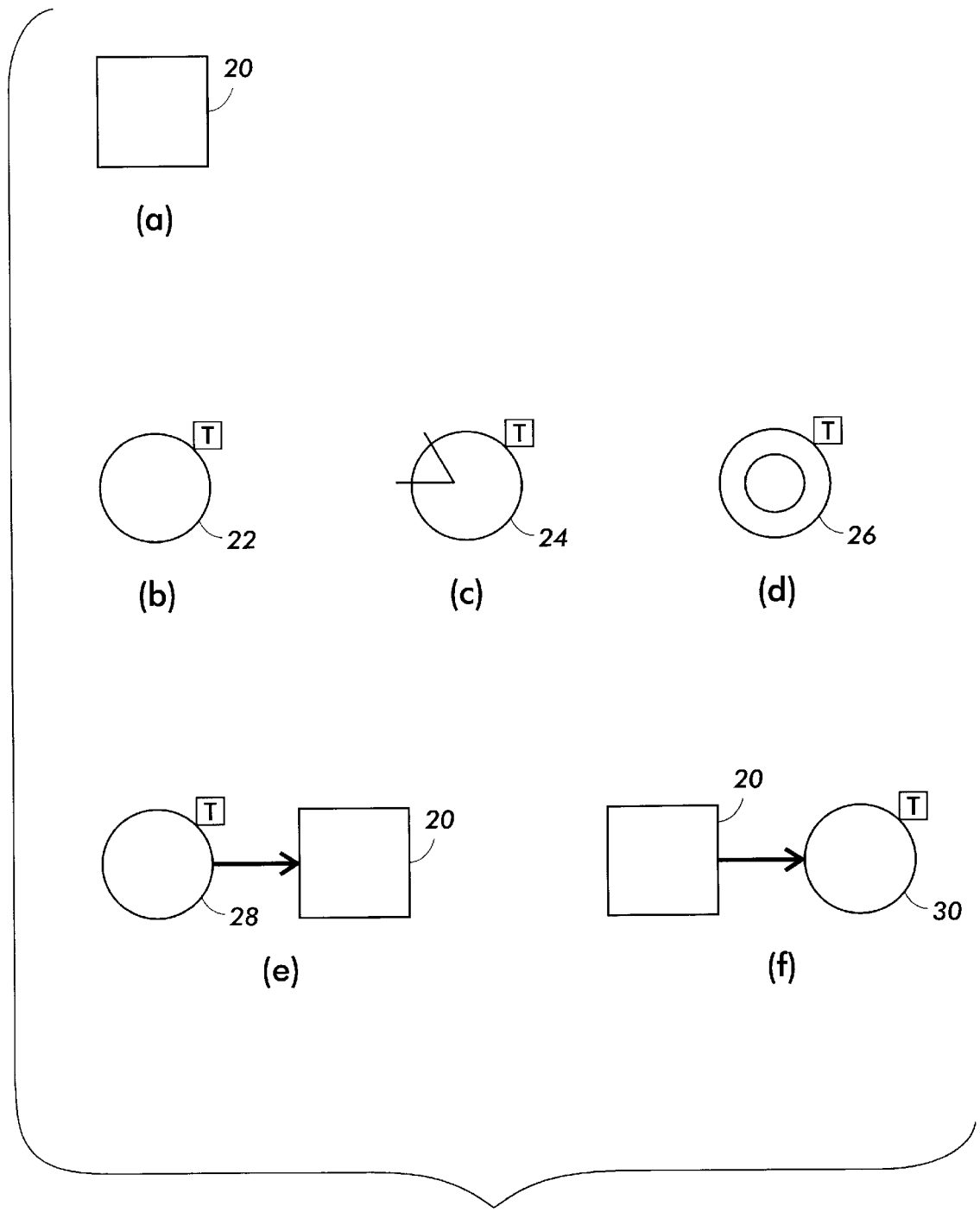
FIGS. 2(*a*)–2(*f*) illustrate actions and enabling and disabling storage locations.

FIGS. 2(a)–2(f) illustrate the basic components of the dependency action system of this invention. As shown in FIG. 2(a), the basic components of the dependency action system are actions 20. The actions 20 define the functional components of the dependency action system in terms of the data that is required and the data that is produced. As shown in FIGS. 2(b)–2(d), the required and produced data are stored in attribute-stamped storage locations 22–26. The attributes used to stamp the attribute-stamped storage locations 22–26 can be a time-stamp or any other arbitrary parameter. Preferably, the attribute used is a time-stamp T or a computation-stamp as defined below. FIG. 2(b) illustrates a general time-stamped storage location 22. FIG. 2(c) illustrates a time-stamped input storage location 24, while FIG. 2(d) illustrates a time-stamped output storage location 26. Storage locations can be both input and output storage locations in which case FIGS. 2c and 2d are combined.

A computation-stamp is to a computation counter as a time-stamp is to a clock. Updating a time-stamp means recording the current clock value in the time-stamp attribute; updating a computation-stamp means recording the current value in the computation counter in the computation-stamp attribute. Whereas the value of the clock increases with time, the value of the computation counter increases whenever new input data is given to the dependency action system. A storage location may have a time-stamp attribute, a computation-stamp attribute, or both. Unless otherwise stated, any reference to a "stamp" encompasses both time-stamps and computation-stamps. A storage location can be either a memory storage location or a file accessed by a path.

FIG. 2(e) illustrates a stamped enabling storage location 28 that enables an action 20. That is, the action 20 is enabled by the enabling storage location 28. In contrast, FIG. 2(f) illustrates an action 20 connected to a stamped disabling storage location 30. That is, the action 20 is disabled by this disabling storage location 30.

Figure 3:
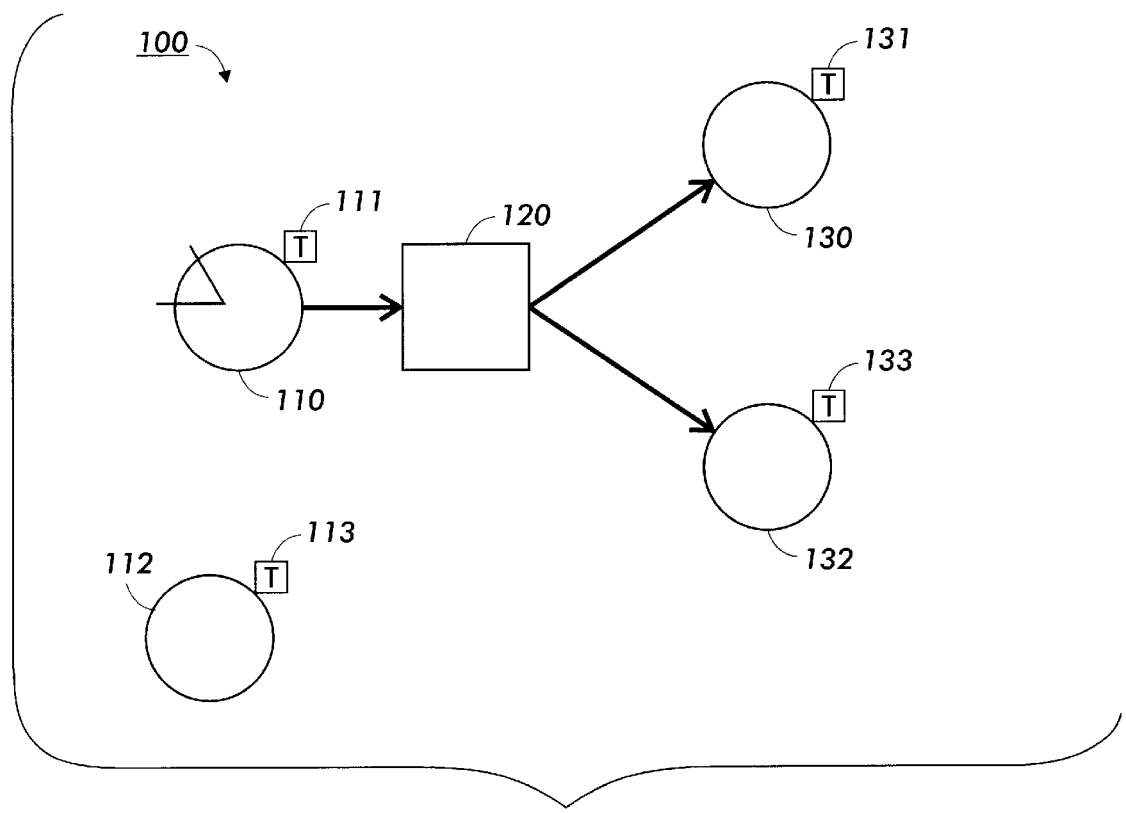
FIG. 3 illustrates an exemplary dependency action system involving one action.

FIG. 3 illustrates an exemplary dependency action system 100 involving an action 120, a single enabling storage location 10, and two disabling storage locations 130 and 132. The storage location 110 is defined by the user to be an enabling storage location for the action 120 and the storage locations 130 and 132 are defined as disabling storage locations for the action 120. As will be explained more fully below, the action 120 becomes an enabled action according to rules defining the enabling relationship between the action 120 and the storage locations, such as the storage location 110. This relationship is expressed in terms of the relative values of the stamps 111, 131 and 133 associated with the enabling and disabling storage locations 110, 130 and 132 associated with the action 120, the type of action, whether it is "eager" or "lazy", and the values of the data stored in the storage locations 110, 130 and 132. These relationships will be described in greater detail below with respect to FIGS. 7–9. Executing the action 120 changes the values stored in none, one or both of the disabling storage locations 130 and 132, depending on the internal rules of the action 120.

The storage location 112 represents another possible storage location that is present but not associated with the action 120, and may be associated with other actions not shown. As discussed below, dependencies between actions and storage locations are user-defined by entering appropriate commands and data through the input device 16. These commands and data can be entered at any time, including while the dependency action system is processing actions. Preferably, such inputs are written into the random access memory storage 15, for subsequent transfer to the permanent storage 19.

For each action, there is a set of one or more enabling storage locations and a set of one or more disabling storage locations. Typically, but not necessarily, the enabling storage locations provide the input data to the associated action and the disabling storage locations receive the output data from the associated action. In general, an eager action is enabled and can be executed when the time-stamp of any one of its enabling storage locations is more recent than the time-stamps of all of its disabling storage locations. A lazy action is enabled and can be executed when the computation-stamps of any one of its enabling storage locations is more recent than the computation-stamps of all of its disabling storage locations. Updating the stamp of any of an action's disabling storage location disables that action. Thus, the execution of an action is controlled by the time-stamps or computation-stamps of its associated enabling and disabling storage locations. Accordingly, an eager action is enabled whenever new data arrives at one of its enabling storage locations, causing the associated time-stamp of that storage location to be updated. In contrast, a lazy action is enabled only when the new data arriving at one of its enabling storage locations is due to the dependency action system having received new input data.

Enabling and disabling storage locations can be files managed by the operating system, or can be locations within a memory. In the former case, the operating system will maintain the time-stamp of those storage locations. In the latter case, the time-stamp for each such storage location is maintained in memory. In either case, if the storage location has an associated computation-stamp, the computation-stamp needs to be maintained in memory. Each storage location has a name, and associated with the name is either: 1) a pair of references to the memory locations of the value and to the time-stamp or computation-stamp; or 2) the path of the file.

Actions come in three varieties: 1) functions that are implemented in a native programming language, e.g., Java, C++; 2) programs that are run by the operating system as separate processes; and 3) actions that are defined by another dependency action system.

A dependency action system may be nested. This means that an action can itself represent another complete dependency action system. Executing such an action amounts to executing the associated dependency action system.

Each action can have a name. A list of enabling storage locations and disabling storage locations is associated with each action, as are the average cost of the action, the kind of action and, depending on the kind of action, either: a) a reference to a function; b) a path to a program; or c) the description of a dependency action system. Also associated with each action are the probabilities that the action updates each associated disabling storage location.

An action is executed by either invoking the associated function, running the associated program as a separate process, or executing the associated dependency action system. The average cost attribute and the update probabilities are adjusted whenever the action is executed. However, the cost may be determined in other ways. The actual cost function can be based on arbitrary parameters, such as time, space, or quality, and may vary with application and requirement.

If multiple actions are enabled, the dependency action system uses a selection rule to determine which of the enabled actions is to be executed. It is possible to use a selection rule based on random choice. A policy can be pre-established that prescribes which action of a set of enabled actions is to be selected for execution. A policy is optimal if it leads to the "cheapest" execution of the dependency action system. It should be appreciated that this is a Markov decision process, as described in "Introduction to Operations Research", F. S. Hillier and G. J. Lieberman, McGraw-Hill, sixth edition, 1996, herein incorporated by reference in its entirety.

Such a decision process requires that at each state, a decision be made as to which of the enabled actions to execute next. The process stops if the set of enabled actions is empty. The cost of the decision is the cost of the selected action.

Accordingly, the efficiency of a dependency action system depends on which of the enabled actions is selected at each state. Standard policy-based planning methods for Markov decision processes can be used to devise the enabled action preference policy of the dependency action system of this invention. While using a Markov decision process provides an optimal execution of a dependency action system, determining such an optimal policy is very expensive. This invention preferably uses a specific type of selection rule, called a preference policy, that is based on a preference relation that specifies if one action is to be preferred over another action.

A dependency action system may be optimized by removing, or not considering to be enabled, those actions that cannot affect, directly or indirectly, the desired output storage locations.

Dynamic change means that dependency action system parameters and actions can be changed by the user or by an external agent while the system is executing the dependency action system. These parameters and actions, along with their sets of enabling and disabling storage locations, are stored in the permanent memory 19. This stored information can be modified by operations, including adding or deleting an action, adding or deleting a storage location, or changing the sets of enabling and disabling storage locations of an action. Importantly, these operations can be executed at any time, even while a dependency action system is executing.

Each action is defined to be either eager or lazy. In determining whether an eager action is enabled, the time-stamps of enabling and disabling storage locations are considered. In determining whether a lazy action is enable, the computation-stamps of enabling and disabling storage locations are considered. Otherwise, there is no difference between eager and lazy actions.

An executing dependency action system can interact with the environment, such as, for example, other programs or users, by performing various input and output operations. For example, actions that perform output or communications operations based on the underlying operation system will generate output data when executed. Input can be provided to the dependency action system from an outside process that assigns input values to appropriate input storage locations of the dependency action system and updates their stamps.

Figure 14:
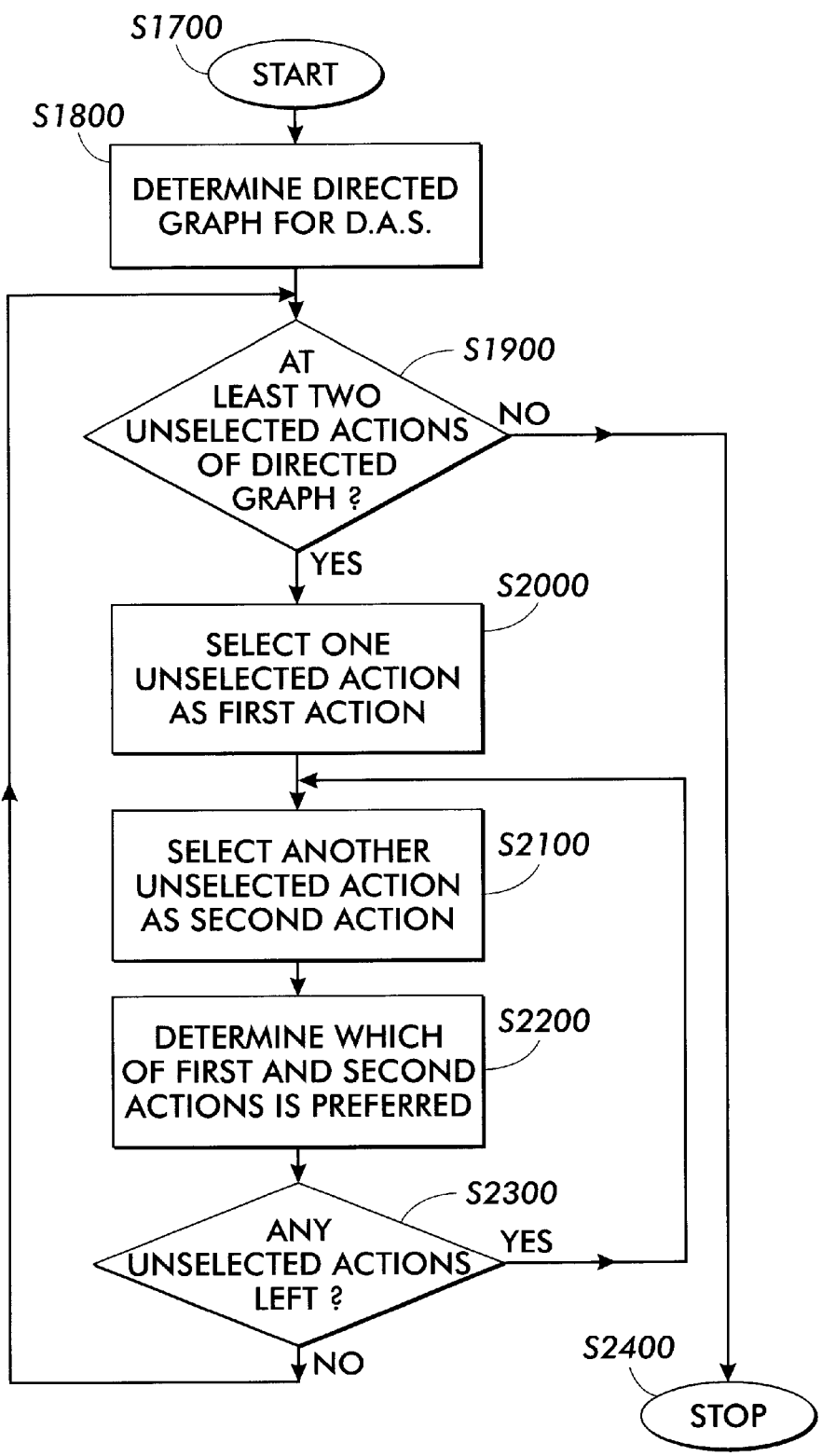
FIG. 14 outlines one preferred method for determining the preference relation used in FIG. 13.
Figure 15:
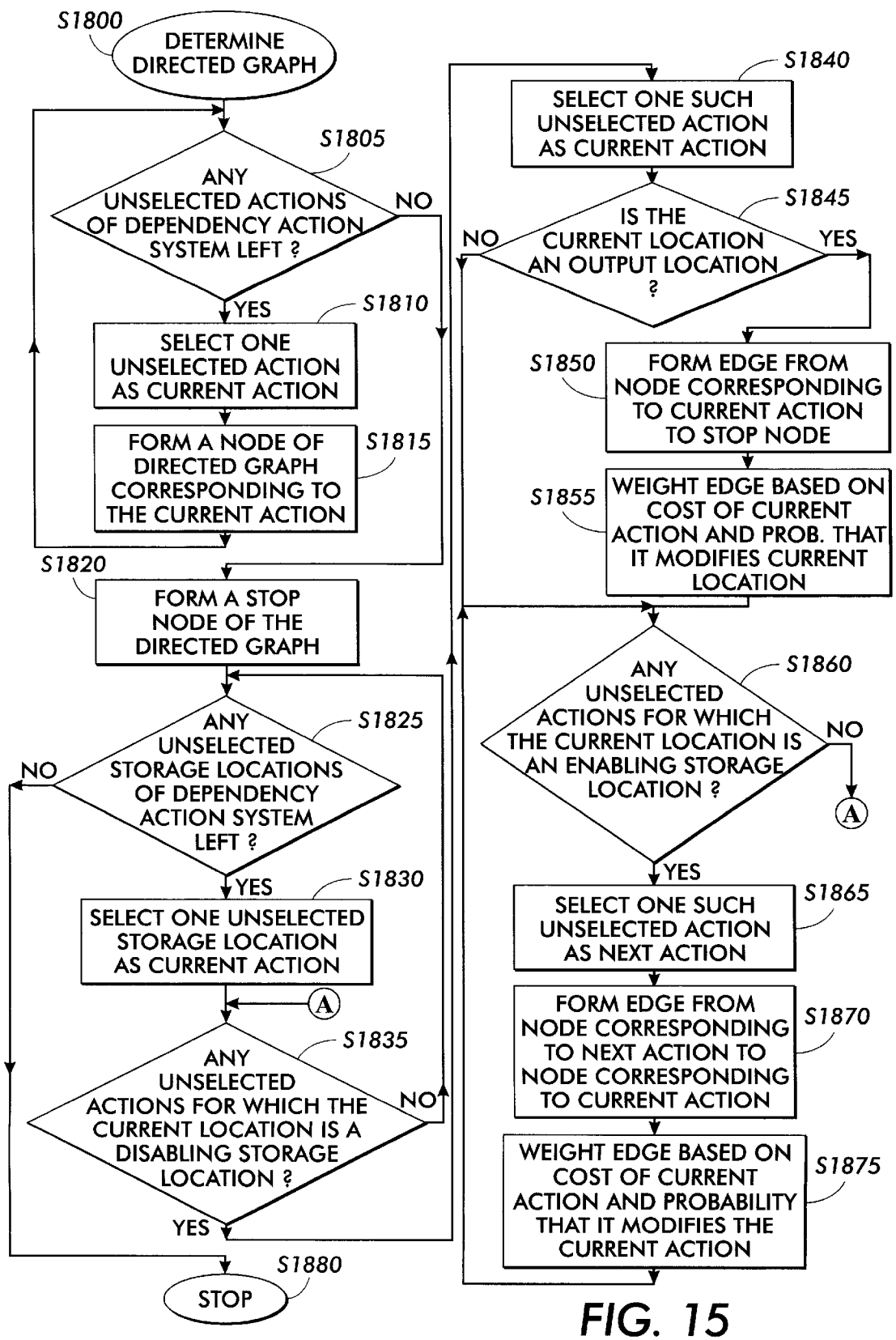
FIG. 15 outlines in greater detail one preferred method for determining the directed graph of FIG. 14.
Figure 16:
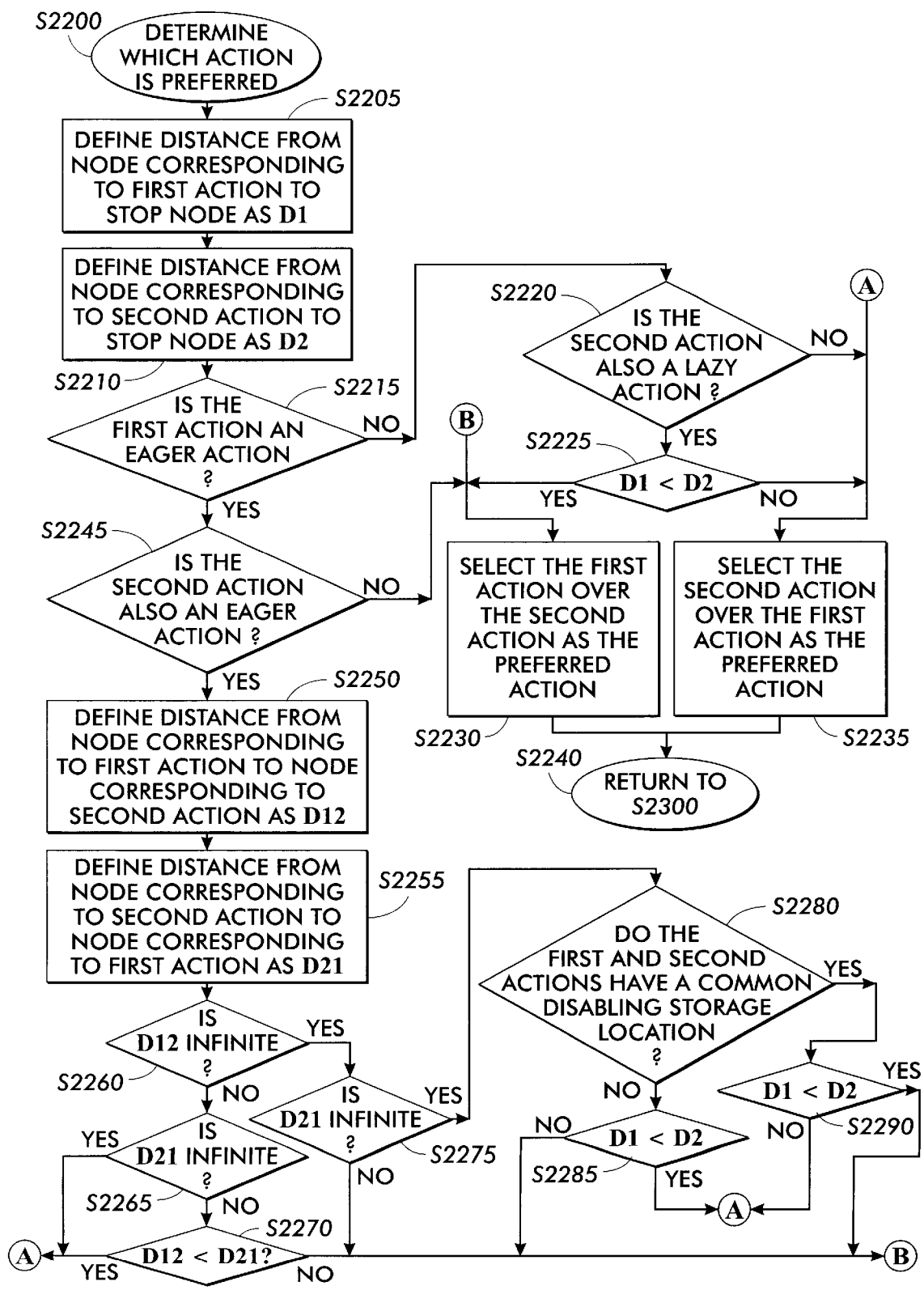
FIG. 16 outlines in greater detail one preferred method for determining which of two actions is preferred of FIG. 14.

An enabled action selection rule is used to select one of several enabled actions for execution. Different selection rules can be used, including a trivial selection rule that picks one of the enabled actions at random. This invention specifies an enabled action preference policy that is described below with respect to FIG. 13. The preference policy uses a stored preference relation. FIGS. 14–16, also described below, illustrates the method for determining the preference relation.

Figure 4:
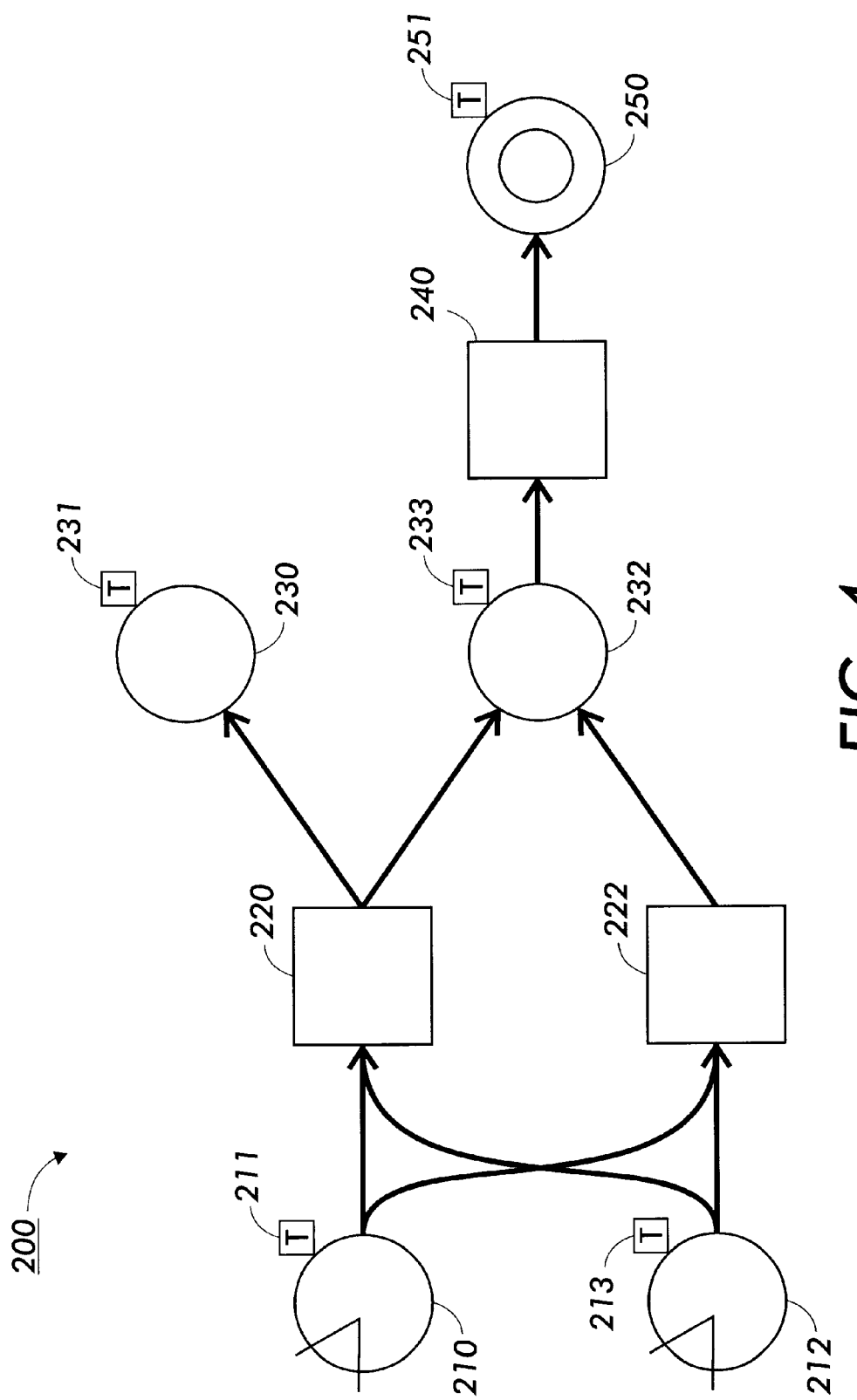
FIG. 4 illustrates an exemplary dependency action system involving three actions.

FIG. 4 illustrates the cumulative progress of an exemplary dependency action system 200. The exemplary dependency action system 200 includes a set of storage locations 210, 212, 230, 232, and 250. Each location has a value which may be undefined. The stamps 211, 213, 231, 233 and 251, respectively, are associated with the locations 210, 212, 230, 232, and 250. The exemplary dependency action system 200 further includes a set of actions 220, 222 and 240. Each action 220, 222, and 240 represents a processing function of arbitrary complexity. The dependency relationships between the storage locations 210, 212, 230, 232, and 250 and the actions 220, 222 and 240 are pre-defined. That is, for each action 220, 222 or 240, one or more of the storage locations are defined as enabling storage locations and one or more of the storage locations 210, 212, 230, 232, and 250 are defined as disabling storage locations. For example, in the exemplary dependency action system shown in FIG. 4, the actions 220 and 222 are both associated with the storage locations 210 and 212 as enabling storage locations. Similarly, the storage location 232 is associated with both actions 220 and 222 as a disabling storage location, while only the storage location 230 is associated with the action 220 as a disabling storage location.

Generally, as each action 220, 222, or 240 reads data from one or more of its enabling storage locations and writes data to one or more of its disabling storage locations, that action updates the stamps associated with each such storage location.

In FIG. 4, the task to be accomplished by the exemplary dependency action system 200 is to determine the value of the output storage location 250. If the action 220 is eager, it is referred to as an "enabled action" if two conditions are met: first, the enabling and disabling storage locations 210 and 212 must be initialized, i.e., they must be defined to contain a valid value, and second, at least one of the time-stamps 211 and 213 must be later than the later of the time-stamps 231 and 233. Similarly, the action 222 is enabled if at least one of the time-stamps 211 and 213 is later than the later of the time-stamps 231 and 233. Thus, when both actions 220 and 222 are enabled, there are two paths to produce a value for the output storage location 250.

Assuming that the dependency action system 200 follows a pre-determined selection policy, the action 220 is chosen over the action 222 and is executed. Thus, a first path in FIG. 4 is established. The execution of the action 220 may produce a value for the disabling storage location 232 and the storage location 230, or both, possibly depending on the internal processing of the action 220.

If the action 220 produces a value for the storage location 232, the time-stamp 233 will be later than both time-stamps 210 and 212 and both actions 220 and 222 will no longer be enabled. If, however, the action 220 produces a value for storage location 230 but not 232, then the action 220 will no longer be enabled because time-stamp 231 will be later than time-stamps 210 and 212. But the action 222 will still be enabled and can be executed to produce a value for the storage location 232. Thus, there are two alternative ways to determine a value for the storage location 232. In this manner, dependency action systems provide redundancy.

When either the action 220 or action 222 writes the new data value into the disabling storage location 232, the associated time-stamp 233 is also updated with the current time. Because the storage location 232 is an enabling storage location for the action 240, as well as being a disabling storage location for the actions 220 and 222, the action 240 is enabled at the same time the actions 220 and 222 are disabled. Because the action 240 is now enabled, it processes the data stored in the storage location 232 and places the resulting data in its disabling storage location 250. At the same time, the time-stamp 251 associated with the storage location 250 is updated with the current time. This disables the action 240. Thus, all actions in the entire exemplary dependency action system 200 are disabled.

The exemplary dependency action system shown in FIG. 4 also illustrates how a storage location 210 can be enabling for more than one action, i.e., the two actions 220 and 222.

Accordingly, either action can be used to determine the data for the disabling storage location 232, possibly from different input data. If one action succeeds and produces output data, the data is stored to the disabling storage location 232, and its time-stamp 233 is updated. This disables the actions 220 and 222. If one action 220 or 222 fails to produce output data for the storage location 232, the other action 222 or 220 will still be enabled and can be executed. In this manner, the dependency action system 200 supports automatic recovery from failure of individual actions.

If, at some point an external mechanism updates the value in one of the enabling storage locations 210 or 212 and thus the stamp 211 or 213 associated with that storage location 210 or 212, the method and system of this invention ensures that the actions 220 and 222 enabled by that storage location 210 or 212 will be re-executed, producing new values in the disabling locations 230 and/or 232.

Figure 5:
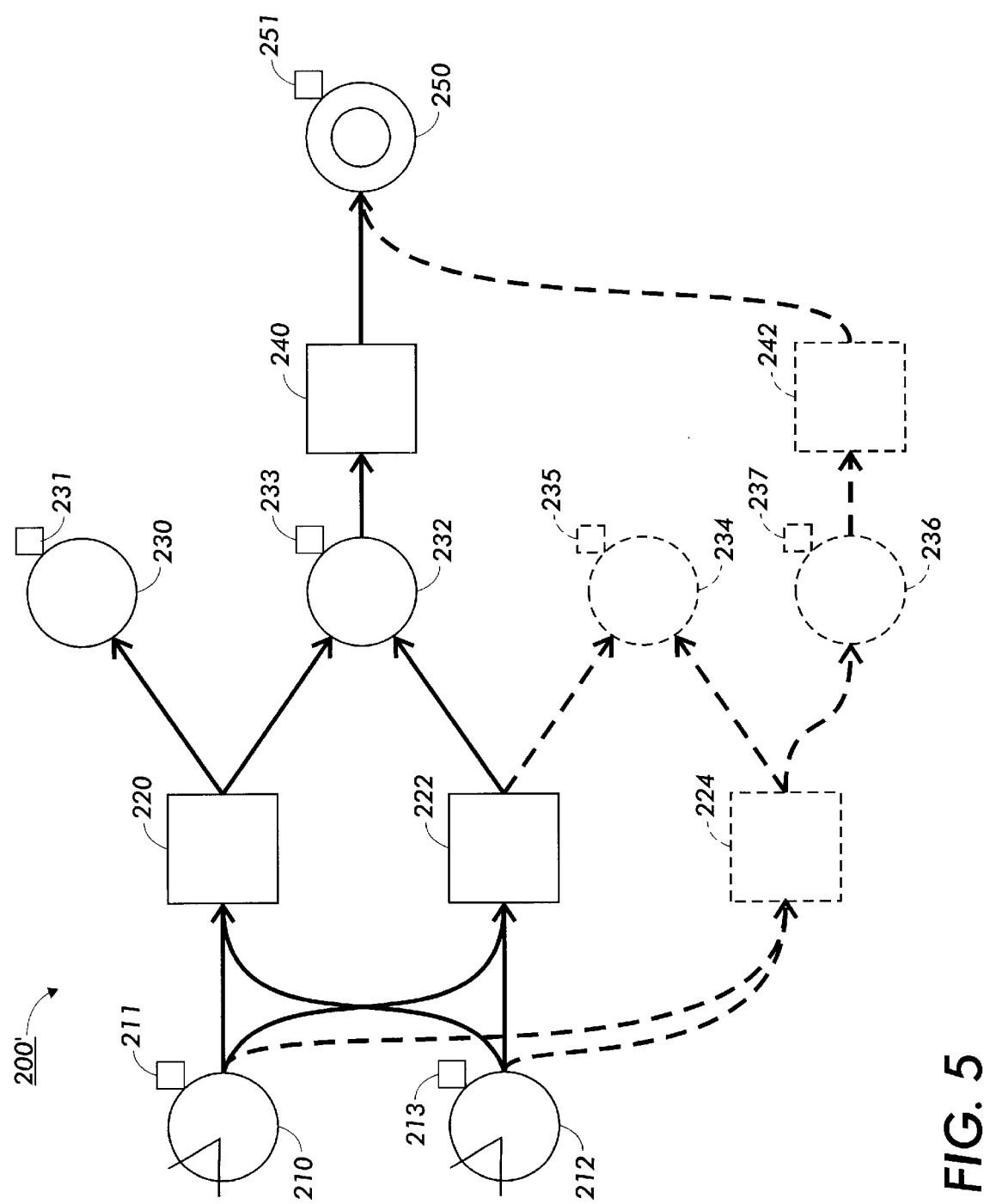
FIG. 5 illustrates an exemplary dependency action system involving the dynamic addition of new actions and storage locations.

FIG. 5 illustrates a second exemplary dependency action system 200' which has a combination of new or altered actions and storage locations dynamically added to extend the dependency action system 200 shown in FIG. 4.

As shown in FIG. 5, additional actions and storage locations, optionally along with cost data associated with each action, can be added during execution of the dependency action system. For example, the user or a separate program can input data changing or adding a storage location 236 and its associated time-stamp 237 and defining the dependency of that storage location 236 with, for example, the new action 224 and 242. In this way, the dependency action system process 200' being executed will encounter the added or changed actions and the associated storage locations the next time the enabling storage locations for the new actions 224 and/or 242 are updated.

The time-stamp analysis described relative to FIGS. 4–5 determines the enabled actions. One enabled action will be selected according to the enabled action selection rule in effect and the types of the enabled actions. That action will then be executed, and will modify the disabling storage locations associated with the executed action. The dependency action system then looks to the current set of enabled actions, selects one, executes it, and repeats this procedure until no enabled actions remain.

Note that in dependency action system 200', there are three different path to determine the desired output value for the storage location 250. These paths include the possible action sequences: action 220 followed by action 240, action 222 followed by action 240, and action 224 followed by action 242. Since actions 220 and 222 determine input data for action 240, they must both perform the same function, possibly using different means. This is called homogeneous redundancy. The actions 224 and 242, however, may determine the result of the storage location 250 in a completely different manner. In particular, the intermediate value of the storage location 236 may be different from that of the storage location 232 and the action 224 may perform a function quite different from the actions 220 and 222. This is called heterogeneous redundancy.

FIG. 6 illustrates a pair of serially connected "eager" actions and the ability of dependency action systems to perform iteration. The dependency action system 400 shown in FIG. 6 includes a first eager action 420 and a second eager action 422. A first storage location 410 is an input storage location and is also an enabling storage location for the eager action 420, as well as being a disabling storage location for the eager action 422. Thus, the storage location 410 connects the output of the eager action 422 to the input of the eager action 420. The eager action 420, in turn, updates the value of the storage location 432 or the storage location 432, depending on the internal rules of the eager action 420.

Similarly, the storage location 430 is an enabling storage location for the eager action 422 and is a disabling storage location for the eager action 420. Thus, the storage location 430 connects the output of the eager action 420 to the input of the eager action 422. Finally, a third storage location 432 is also a disabling storage location for the eager action 420. Thus, when the input storage location 410 is provided with valid data, either by another action (not shown) of the dependency action system 400, a user, or some independently running process, a time-stamp 411 associated with the input storage location 410 is updated. Because the time-stamp 411 is now later than both of the time-stamps 431 and 433 associated with the disabling storage locations 430 and 432 for the eager action 420, the eager action 420 is now enabled. Thus, if the eager action 420 is executed and updates one or both of the disabling storage locations 430 and/or 432, time-stamps 431 and/or 433 associated with the updated storage locations 430 and/or 432 are updated to reflect the time that storage location was updated.

If the storage location 430 is updated, the time-stamp 431 for the storage location 430 is now later in time than the time-stamp 411 for the storage location 410. Thus, the eager action 422 is enabled. If the eager action 422 is executed and outputs data to the storage location 410, its associated time-stamp 411 is also updated to reflect the time at which the storage location 410 was updated. This, however, means that the time-stamp 411 for the storage location 410 is now later in time than the time-stamp 431 of the storage location 430. Thus, the eager action 420 is re-enabled. Thus, the eager actions 420 and 422 will continue to cycle through this process until such time that the storage location 430 is not updated by the output of the eager action 420. That is, only when the eager action 420 updates the storage location 432, but does not update the storage location 430, will the cyclic execution of the eager actions 420 and 422 stop.

FIG. 7 illustrates a pair of serially connected "lazy" actions in a dependency action system 500. For example, the dependency action system 500 shown in FIG. 7 includes a first lazy action 520 and a second lazy action 522. A first storage location 510 acts as an enabling storage location for the first lazy action 520 and a disabling storage location for the lazy action 522. Thus, the storage location 510 connects the output of the lazy action 522 to the input of the lazy action 520. Similarly, a second storage location 530 acts as an enabling storage location for the lazy action 522 and a disabling storage location for the lazy action 520. Thus, the storage location 530 connects the output of the lazy action 520 to the input of the lazy action 522. When the lazy action 520 and 522 and the storage locations 510 and 530 are first initialized, both the storage location 510 and the storage location 530 are undefined.

Because the actions 520 and 522 are lazy, the storage locations 510 and 530 must both have a computation-stamp attribute 511 and 531 respectively. If storage location 510 receives data either from some third action (not shown), a user, or some independently operating process, its computation-stamp is updated. If this input constitutes a new computation, it will have a higher computation number and the computation-stamp 511 will be larger than the computation-stamp 531 of the storage location 530. Because the storage location 510 is enabling and the storage location 530 is disabling for the lazy action 520, the lazy action 520 will now be enabled. If the action 520 is executed and updates the storage location 530, the computation-stamp 531 will be updated to the current computation number. At this point the computation numbers 531 and 511 are equal and neither action 520 nor action 522 is enabled.

If the computation count is incremented, i.e., a new computation is started, and new data is stored in the storage location 530, then the computation-stamp 531 will be larger than the computation-stamp 511 of the storage location 510 and the action 522 will be enabled. If the action 522 is executed and updates the storage location 510, the computation-stamp 511 is updated to be equal to the computation-stamp 531. Thus, neither the action 520 nor the action 522 is enabled.

Thus, in the dependency action system 500, either one of the storage locations 510 or 530 can be taken as input storage locations and the other as output storage locations. If the storage location 510 is taken to be the input, the action 510 will produce the output value in the storage location 530. If the storage location 530 is taken to be the input, the action 522 will produce the output value in the storage location 510.

Figure 8:
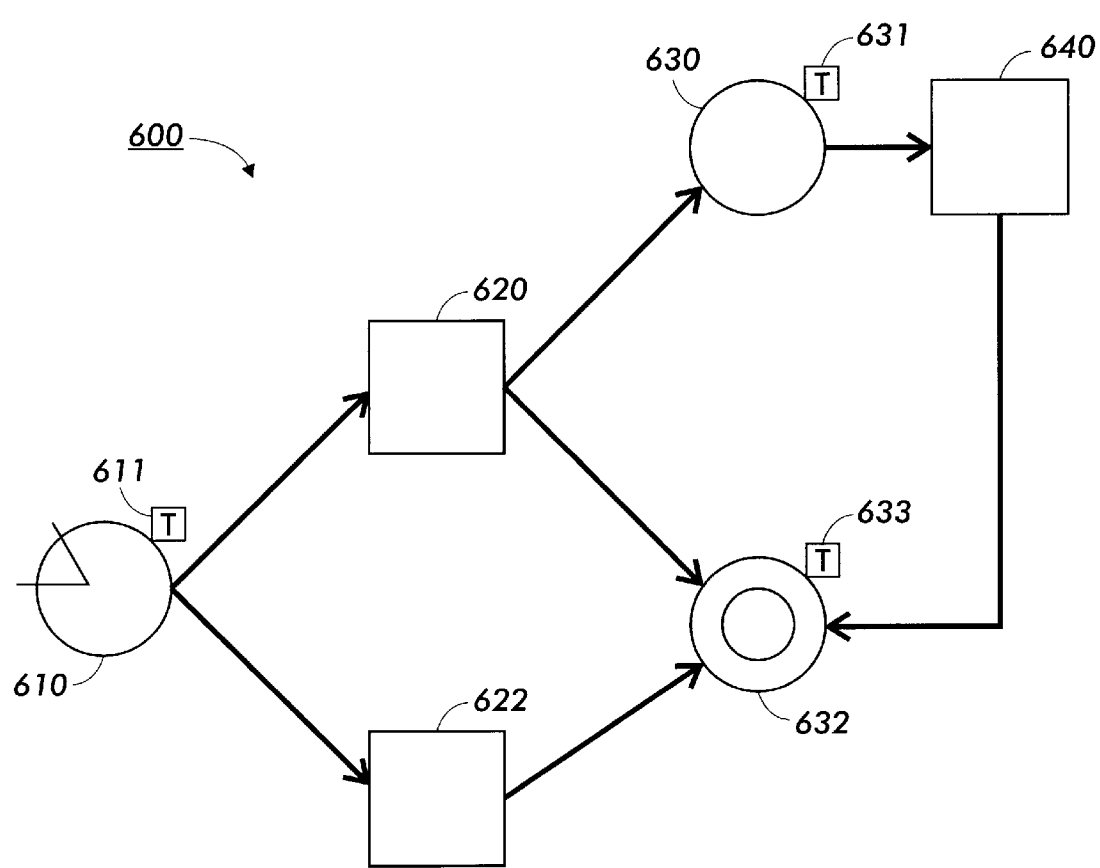
FIG. 8 illustrates alternative resolutions to an eager dependency action system in a failure condition.

FIG. 8 illustrates the failure condition aspect of the dependency action system of this invention in greater detail. Generally, a failure condition of an action must be provided when defining the enabling, disabling, and output storage locations for an action. FIG. 8 illustrates two failure cases, each addressing one method for dealing with the failure of an action. As shown in FIG. 8, the dependency action 600 includes a first action 620, a second action 622, and a third action 640. An input storage location 610 is an enabling storage location for the actions 620 and 622. An output storage location 632 is a disabling storage location for each of the actions 620 and 622. A storage location 630 is a second disabling storage location for the action 620, and is also an enabling storage location for the action 640. The storage location 632 is a disabling storage location for the action 640.

In normal operation, the storage location 610 is provided with new data, either by another action (not shown) of the dependency action system 600, a user, or an independently executing procedure. As a result, the stamp 611 is updated and is now later than the stamps 631 and 633 of the storage location 630 and 632. Accordingly, the storage locations 620 and 622 are enabled. Next, assuming the enabled action selection rule selects the action 620, the action 620 begins executing. Assuming the action 620 terminates normally, it produces output data which is stored in the storage location 632. As a result, the stamp 633 associated with the storage location 632 is updated, thus disabling the action 620.

However, if the action 620 fails to terminate normally, i.e., it fails, either one of two recovery modes can be used to deal with this failure. In a first failure mode, the action 620, when it fails, produces data which is stored in the failure storage location 630. As a result, the stamp 631 is updated. Because the storage location 630 is also an enabling storage location for the action 640, the action 640 is now enabled. The action 640 can be a program or function that performs error recovery based on the data stored in the storage location 630, and uses an alternative method for producing a value in the output storage location 632.

In a second failure mode, when the enabled action 620 fails, rather than producing an output value to be stored in a failure storage location, the action 622 is still enabled and can provide recovery by using an alternate mechanism for determining the desired value of the storage location 632. Note that this amounts to "backtracking". The enabled action selection rule determines which of the enabled actions 620 and 622 is tried first. Similarly, if the action 620 does not update the storage location 632, but updates the storage location 630, the selection rule determines whether the action 640 or the action 622 is used for recovery. This behavior can be change by the designer of the dependency action system by adding additional dependencies. For example, if the storage location 630 is made a disabling storage location for the action 622, the recovery action 640 will always be preferred over the action 622.

Figure 9:
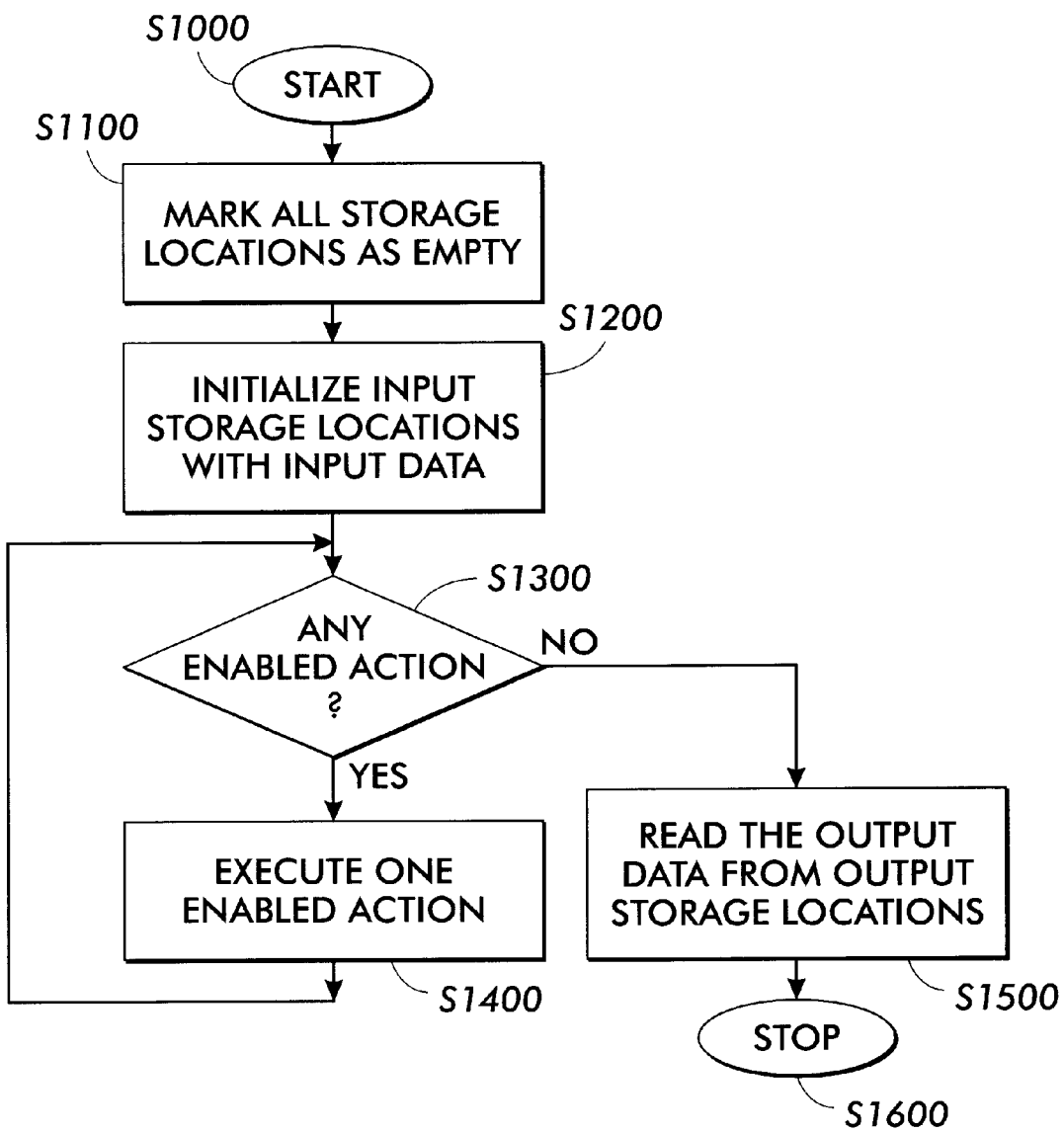
FIG. 9 is a flowchart outlining in general terms the operation of the dependency action systems of this invention.

FIG. 9 is a flowchart outlining in general terms one operation of the dependency action system according to this invention. The dependency action system control routine begins in step S1000. Control then continues to steps 1100, where the dependency action system is initialized by setting all storage locations to "empty". That is, in step S1100, the dependency action system recognizes that the contents of all storage locations are not the result of either external input or the result of a dependency action system process. All empty storage locations are called undefined. A storage location that is not undefined is said to be defined. A file storage location is marked undefined by ensuring that the file does not exist. A memory storage location is marked undefined by setting its time-stamp to an illegal value. Control then continues to step S1200.

In step S1200, input data is provided to one or more of the defined storage locations. Then, in step S1300, the control system determines if any of the actions of the dependency action system are "enabled", as described above with respect to FIG. 4. If there are any enabled actions, control continues to step S1400. Otherwise, control jumps to step S1500. In step S1400, one of the enabled actions is executed.

If only one action is enabled, that action is, of course, selected for execution. If two or more actions are enabled, one of the enabled actions is selected for execution. The procedure for selecting the enabled action to be executed is described below in detail with respect to FIG. 10. Control then returns to step S1300.

Once there are no more enabled actions, control jumps to step S1500, where the resulting data stored in one or more of the disabling storage locations is output. The control system accesses the appropriate storage locations in either of the storage devices 15 or 19 and/or generates output with the output device 17. Control then continues to step S1600, where the control routine for the dependency action system stops.

It should be appreciated that a dependency action system can be used to realize non-terminating monitor or control processes. In this case, step S1300 can be modified such that if no action is enabled, the system waits until some action is enabled. This will happen due to external inputs that affect the time-stamps of one or more storage locations.

Figure 10:
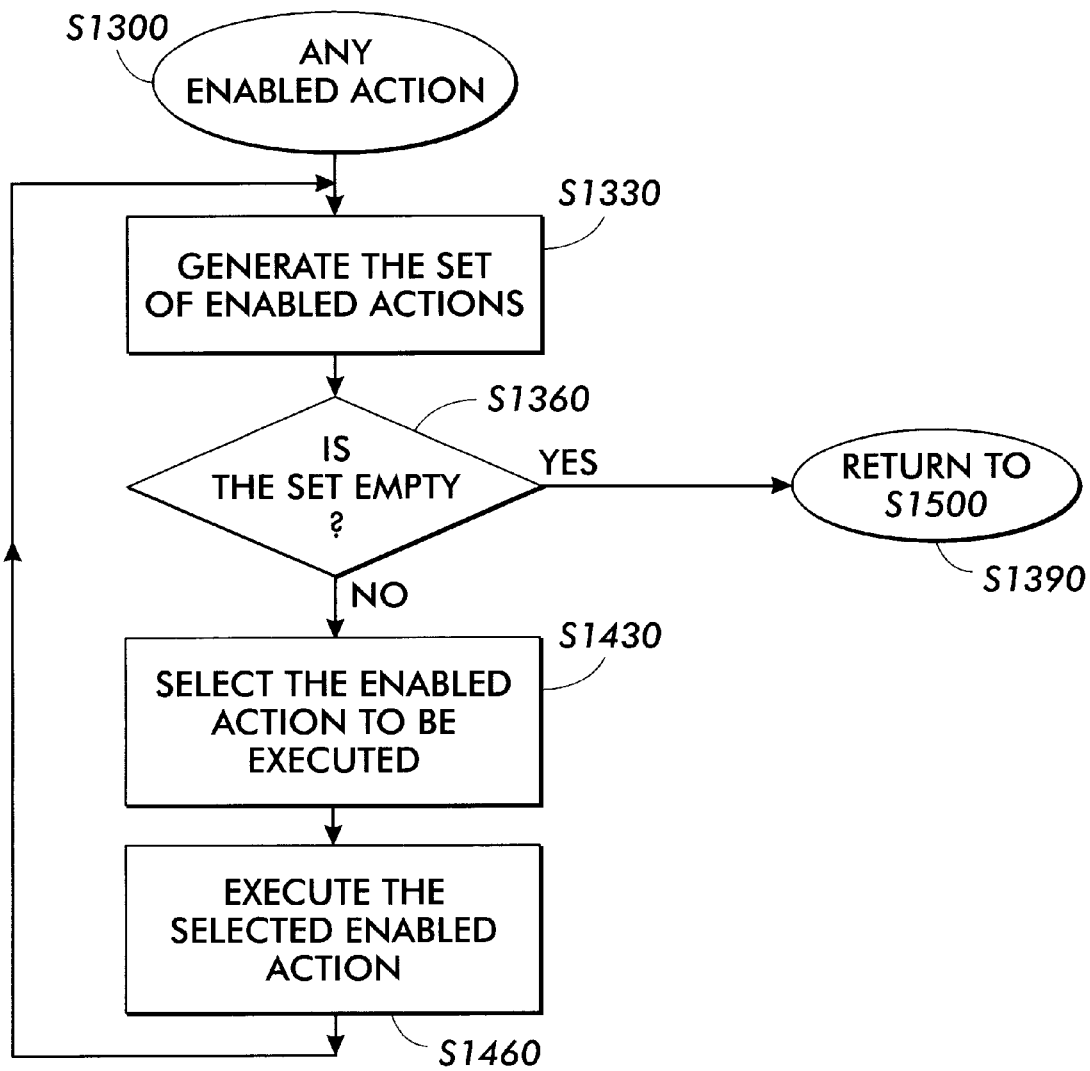
FIG. 10 is a flowchart outlining steps S1300 and S1400 of FIG. 9 in greater detail.

FIG. 10 is a flowchart outlining in greater detail steps S1300 and S1400 of FIG. 9. Starting in step S1300, control continues to step S1330, where a set of enabled actions is generated. The set of enabled actions is regenerated each time step S1330 is performed, because the set must reflect the latest enabled/disabled status of the various actions. The latest enabled/disabled status is reflected by the time-stamps or computation-stamps of the enabling and disabling storage locations, which may have been changed either do to user input, external system input, or as the result of the dependency action system executing.

Once the set of enabled action is regenerated in step S1330, control continues to step S1360. In step S1360, the control routine determines if the set of enabled actions is empty. If so, control continues to step S1390, which returns control to step 1500 of FIG. 9. Otherwise, control jumps to step S1430.

In step S1430, the preferred enabled action is selected according to some selection rule. The preferred embodiment of the invention uses a preference policy, and more particularly, a preference relation, as the selection rule. The details of this preference policy are described below in reference to FIG. 13. A particularly simple selection rule is to randomly choose one of the enabled actions. Next, in step S1460, the selected action selected in step S1430 is executed. It should be appreciated that whenever the value of a storage location is updated in the process of executing the selected action of step S1430, the time-stamp and computation-stamp of the storage location is updated. Control then returns to step S1330.

FIG. 11 illustrates a simple dependency action system 1000 that determines the greatest common divisor of two input numbers. As shown in FIG. 11, the dependency action system 1000 comprises two input storage locations 1010 and 1012. The dependency action system 1000 further includes four intermediate eager actions 1020, 1022, 1024 and 1026 that implement four different arithmetic functions. The dependency action system 1000 further includes four intermediate storage locations 1030, 1032, 1034 and 1036. Finally, the dependency action system 1000 includes an eager assignment action 1040 and an output storage location 1050.

In particular, the input storage locations 1010 and 1012 act as enabling storage locations for the test function actions 1020 and 1026 and the output action 1040 and as disabling storage locations for the arithmetic function actions 1022 and 1024. Similarly, the intermediate storage locations 1030 and 1032 act as disabling storage locations for the test function action 1020. The intermediate storage location 1032 also acts as an enabling storage location for the arithmetic function action 1024. Likewise, the intermediate storage locations 1034 and 1036 acts as disabling storage locations for the test function action 1026 while the storage location 1034 also acts as an enabling storage location for the arithmetic function action 1022. The output storage location 1050 acts as a disabling storage location for the assignment action 1040.

In particular, the test function action 1020 determines if the number currently stored in the X storage location 1010 is less than the number currently stored in the Y storage location 1012. If so, the action 1020 terminates and provides valid data to the storage location 1032, thus enabling the arithmetic function action 1024. Otherwise, the test function action 1020 fails and writes the failure condition to the storage location 1030. Once enabled, the arithmetic function action 1024 subtracts the current value stored in the X storage location 1010 from the current value stored in the Y storage location 1012 and stores the resulting value in the Y storage location 1012.

In contrast, the test function action 1026 determines if the value stored in the Y storage location 1012 is less than the value stored in the X storage location 1010. If so, the action terminates and provides valid data to the storage location 1034, thus enabling the arithmetic function action 1022. Otherwise, the arithmetic function action 1026 fails and writes data to the failure storage location 1036. Once the arithmetic function action 1022 is enabled and executed, it subtracts the value stored in the Y storage location 1012 from the value stored in the X storage location 1010 and writes the resulting value in the X storage location 1010.

When executed, the assignment action 1040 outputs the value stored in the X storage location 1010 to the output storage location 1050.

In operation, two numbers X and Y are stored to the X and Y storage locations 1010 and 1012, respectively. This enables the test function actions 1020 and 1026 as well as the assignment action 1040. Based on the defined enabled action selection rule, one of the test function actions 1020 and 1026 and the output action 1040 will be selected first. At each time period, one of the remaining and new enabled actions will be selected and may enable further actions. The dependency action system 1000 will continue cycling through the various enabled actions until no more actions are enabled, at which time the dependency action system 1000 will end and the value stored in the output storage location 1050 will be output as the greatest common divisor of the input values X and Y.

Figures 12, 13:
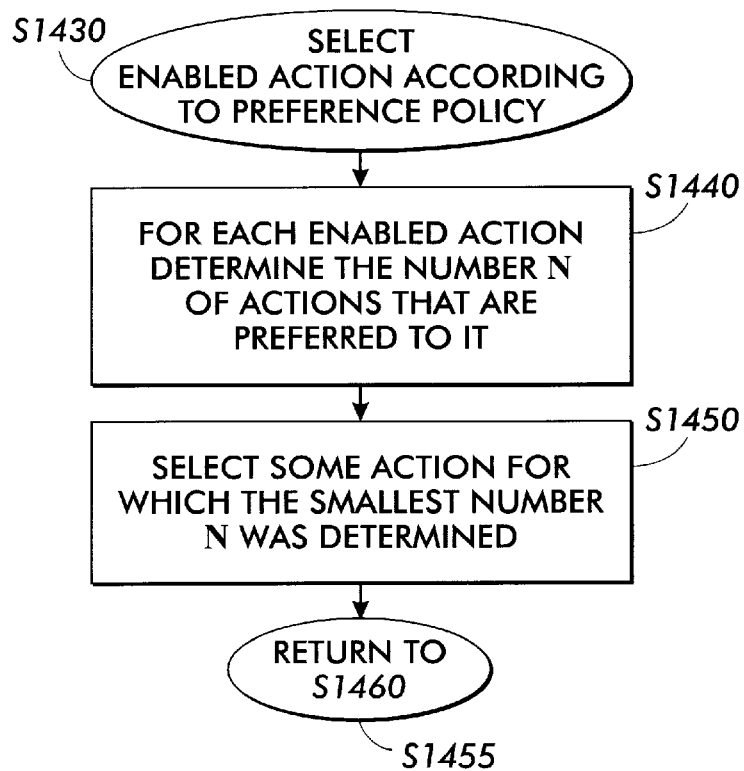
FIG. 12 is a timing diagram of an execution of the exemplary dependency action system shown in FIG. 11.
FIG. 13 is a flowchart outlining in greater detail one preferred method for selecting an enabled action for execution of FIG. 10, based on a preference relation.

FIG. 12 is a timing diagram for one execution of the dependency action system 1000 using the values 34 and 57 for X and Y. FIG. 12 illustrates, for each time period, the set of enabled actions that are selectable according to the defined enabled action selection rule. The execution of the dependency action system 1000 shown in FIG. 11 used a random enabled action selection rule for each time period, where the selected action is underlined.

Initially, after step S1100 of FIG. 9 has been performed, all storage locations 1010, 1012, 1030, 1032, 1034, 1036, and 1050 are marked as "empty"; i.e., they are undefined. Next, according to step S1200 of FIG. 9, the X and Y input storage locations 1010 and 1012 are initialized with the values 34 and 51, respectively. Storage locations 1010 and 1012 are now defined and their time-stamps are set to the current time, 1 in the example.

Accordingly, at time 1, the test function actions 1020 and 1026 and the output action 1040 are enabled because at least one of their enabling storage locations have time-stamps later than the time-stamps associated with all of their disabling storage locations. Because the dependency action system 1000 is using a random enabled action selection rule, any one of the enabled actions 1020, 1026 or 1040 can be selected for execution. Thus, in this example, as shown in FIG. 12, the enabled action 1020, is selected which tests to determine if X is less than Y. That is, the action 1020 compares X and Y. If X is less than Y, the storage location 1032 is set to true and its time-stamp 1033 is updated and set to 2. Otherwise, the action 1020 fails, the storage location 1030 is set to false and its associated time-stamp 1031 is set to 2. In either case, the action 1020 is disabled, because one of its disabling storage locations 1030 or 1032 has a more recent time-stamp than all of its enabling storage locations 1010 and 1012.

In this example, as shown in FIG. 12, the selected action 1020 completes, setting the storage location 1032 to true and the time-stamp location 1033 to 2, thus enabling the action 1024. This is shown relative to time 3 in FIG. 12.

Next, at time 3, the enabled action 1040 is randomly selected and the output storage location 1050 is set to the value of the X storage location 1010, and its associated time-stamp 1057 is set to 3. Accordingly, at this time, the output storage location 1050 contains valid data, in this case, 34. Thus, the output action 1040 is no longer enabled.

Thus, at time 4 only two actions, the test function action 1026 and the arithmetic function action 1024, are enabled. As shown in FIG. 12, at time 4, the last function action 1026 is randomly selected. Because Y is not less than X, the selected action 1026 fails. As a result, the value false is written to the storage location 1036 and its associated time-stamp 1037 is set to 4, thus disabling the selected action 1026.

However, as a result, at time 5 only the action 1024 is enabled, and it is, of course, selected. As a result X, or 34, is subtracted from Y, or 51, and the resulting value, 17 is stored to the Y storage location 1012. At the same time, the time-stamp 1013 associated with the Y storage location 1012 is set to 5. This, in turn, re-enables each of the actions 1020, 1026 and 1040, as shown in FIG. 12 relative to time 6.

Then, at time 7, the action 1026 is randomly selected. Because Y is now less than X, the selected action 1026 terminates. Accordingly, the storage location 1034 is set to true and the associated time-stamp 1035 is set to 7, thus disabling the action 1026.

Next, as shown in FIG. 12, at time 8, the newly enabled action 1022 is randomly selected. As a result, Y, or 17, is subtracted from X, or 34, resulting in 17, which is stored in the X storage location 1010. At the same time, the associated time-stamp 1011 is set to 8, thus re-enabling all of the actions 1020, 1026 and 1024.

Then, at time 9, the re-enabled action 1020 is selected. However, at this time, X is not less than Y. The test of action 1020 is false. Accordingly, the disabling storage location 1030 and its associated time-stamp 1031 are updated, thus disabling the action 1020. Next, at time 10, the action 1026 is randomly selected. Because Y is also not less than X, the action 1026 fails. This causes the disabling storage location 1036 and its associated time-stamp 1037 to be updated, thus disabling the action 1026. Finally, at time 11, the only remaining enabled action, the output action 1040, is selected. The assignment action 1040 outputs the values stored in the X storage location 1010 to the output storage location 1050 and updates its associated time-stamp 1051. Because there are no more enabled actions, the dependency action system 1000 terminates.

As shown in FIG. 9, this execution of the dependency action system 1000 proceeds until there are no more enabled actions. At that point, the value of the output storage location 1050 is output, and can be read as a valid output.

It should be appreciated that the execution of the dependency action system 1000 is non-deterministic. The dependency action system 1000 can make redundant determinations, e.g., the action 1040 can be executed multiple times even before the proper result has been reached. This particular dependency action system 1000 does not contain redundant functional components, although such components can readily be included.

The dependency action system of this invention uses the selection rule to determine which of two or more enabled actions should next be executed. The above-outlined execution of the dependency action system 1000 used a random enabled action selection rule. However, a more efficient selection rule for the dependency action system 1000 would prefer the computation actions 1022 and 1024 over the test actions 1020 and 1026, and would prefer any other action over the output action 1040.

Figure 18:
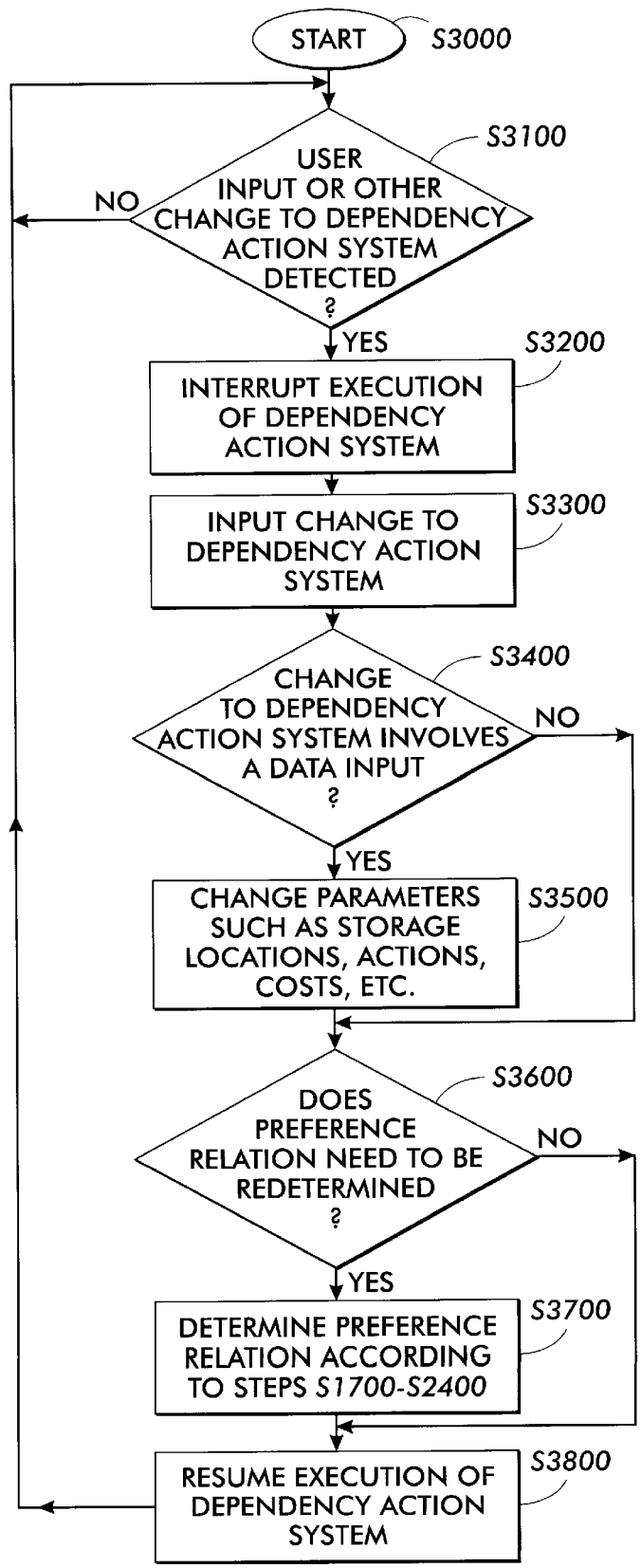
FIG. 18 is a flowchart outlining the dynamic update of a dependency action system.

Instead of a random selection rule, the preferred embodiment of this invention uses as the selection rule a preference relation that specifies which of any two actions is to be preferred over the other. This type of preference relation is represented by a table that is determined once and stored in memory. This process is described below with reference to FIGS. 13–16. The table will be redetermined if and when the dependency action system changes. This is illustrated in FIG. 18.

FIG. 13 is a flowchart outlining in greater detail the method for selecting an enabled action for execution of step S1430 based on the preference relation. As shown in FIG.

13, the preference relation has already been determined. Thus, upon starting in step S1430, control continues to step S1440. In step S1440, the preference relation is analyzed to determine, for each enabled action, how many other actions are preferred to that action. Then, in step S1450, the enabled action which has the smallest number of other actions that preferred to it is selected as the action to be executed. Then, in step S1455, control returns to step S1460.

FIGS. 14, 15 and 16 are flowcharts outlining in greater detail the method for determining the preference relation. FIG. 14 outlines the general procedure for determining the preference relation. As shown in FIG. 14, the control routine begins in step S1700, and continues with step S1800. In step S1800, a directed graph is constructed. Next, in step S1900, the directed graph is checked to determine if there are at least two unselected actions of the directed graph remaining to be selected. If there are at least two unselected actions, control continues to step S2000. Otherwise, if there are not at least two unselected actions, control jumps to step S2400. In step S1900, two unselected actions are checked for because, if there is only one remaining unselected action of the directed graph, obviously there is no other action for that unselected action to be preferred over.

In step S2000, one of the unselected actions is selected as the current first action, and is marked as selected. Then, in step S2100, one of the remaining unselected actions is selected as the current second action. Next, in step S2200, the directed graph is checked to determine which of the current first and second actions is preferred over each other, and the result is stored in the preference relation for the dependency action system relative to those two actions. Control then continues to step S2300.

In step S2300, the directed graph is checked to determine if there are any other unselected actions left after ignoring those unselected action that have previously been selected as the current second action. If any such unselected action remains, control jumps back to step S2100 for selection of a new current second action. Otherwise, control jumps back to step S1900 for determination if there are at least two unselected actions still remaining in the directed graph.

In step S2400, the control routine stops.

FIG. 15 outlines in greater detail the method for constructing the directed graph for a dependency action system of step S1800. Starting in step S1800, control continues to step S11805, where the dependency action system is checked to determine if there are any unselected actions left in the dependency action system. If so, control continues to step S1810. Otherwise, control jumps to step S1820.

In step S1810, one of the unselected actions of the dependency action system is selected as the current action. Then, in step S1815, a new graph node of the directed graph is constructed for the current action and is associated with that action. Control then returns to step S1805, and continues to loop through steps S1805–S1815 until there are no more unselected steps in the dependency action system. That is, once there are no more actions for which a graph node needs to be generated, control continues to step S1820.

In step S1820, a stop node is generated and added to the directed graph. Then in step S1825, the dependency action system is checked to determine if there are any unselected storage locations of the dependency action system left. If so, control continues to step S1830. Otherwise, control jumps to step S1880.

In step S1830, one of the unselected storage locations is selected as the current storage location. Then, in step S1835, the dependency action system is checked to determine if there is any unselected action for which the selected storage location is a disabling storage location. If there is at least one such unselected action, control continues to step S1840. Otherwise, control returns to step S1825.

In step S1840, one of the actions for which the selected storage location is a disabling storage location is selected as the current action. Then, in step S1845, the current storage location is checked to determine if it is an output storage location. If so, control continues to step S1850. Otherwise, control jumps to step S1860.

In step S1850, an edge is added to the graph from the node associated with the current action to the stop node. Then, in step S1855, a weight is assigned to that edge. The weight is determined as the cost of the current action divided by the probability that the current action will update the current storage location. Control then continues to step S1860.

In step S1860, the dependency action system is checked to determine if there are any unselected actions of the dependency action system for which the current storage location is an enabling storage location. If there is at least one such unselected action, control continues to step S1865. Otherwise, control again returns to step S1835. In step S1865, one of the actions for which the selected storage location is an enabling storage location is selected as the next action. Then, in step S1870, an edge is added to the graph from the node associated with the current action to the node associated with the next action. Next, in step S1875, a weight is assigned to that edge. The weight is determined as the cost of the current action divided by the probability that the current action will update the current storage location. Control then returns to step S1860.

FIG. 16 outlines in greater detail the determination which of the first and second actions is to be preferred over the other according to step S2200. Starting in step S2200, control continues to step S2205. In step S2205, the distance from the node corresponding to, or associated with, the first action to the stop node is defined as D1. Then, in step S2210, the distance from the node corresponding to, or associated with, the second action to the stop node is defined as D2. Next, in step S2215, the dependency action system is checked to determine if the first action is an eager action. If so, control continues to step S2220. Otherwise, if the first action is a lazy action, control jumps to step S2245.k In step S2220, the dependency action system is checked to determine if the second action is also a lazy action. If so, control continues to step S2225. Otherwise, if the second action is an eager action, the second action is preferred, and control jumps directly to step S2235.

In step S2225, the distances D1 and D2 are compared to determine if D1 is less than D2. If so, the first action is preferred, and control continues to step S2230. Otherwise, the second action is preferred, and control jumps to step S2235.

In step S2230, the first action is preferred over the second action and this preference is recorded to the preference relation for the dependency action system relative to these two actions. Control then jumps to step S2240, where control is returned to step S2300. In contrast, in step S2235, the second action is preferred over the first action and this preference is recorded to the preference relation for the dependency action system relative to these two actions. Control then continues to step S2240.

In step S2245, the dependency action system is checked to determine if the second action is also an eager action. If so, control continues to step S2250. Otherwise, if the second action is a lazy action, the first action is preferred, and control jumps to step S2230.

In step S2250, the distance from the node corresponding to, or associated with, the first action to the node corresponding to, or associated with, the second action is defined as D12. If, in the directed graph, the node corresponding to, or associated with, the second action cannot be reached by any path from the node corresponding to, or associated with, the first action, the distance D12 is defined as infinite. Then, in step S2255, the distance from the node corresponding to, or associated with, the second action to the node corresponding to, or associated with, the first action is defined as D21. If, in the directed graph, the node corresponding to, or associated with, the first action cannot be reached by any path from the node corresponding to, or associated with, the second action, the distance D21 is defined as infinite.

Then, in step S2260, the distance D12 is checked to determine if it is infinite. If the distance D12 is not infinite, control continues to step S2265. Otherwise, if the distance D12 is infinite, control jumps to step S2275.

In step S2265, the distance D21 is checked to determine if it is infinite. If the distance D21 also is not infinite, control continues to step S2270. Otherwise, if the distance D12 is infinite, the second action is preferred, and control jumps to step S2235.

In step S2270, the distances D12 and D21 are compared to determine if D12 is less than D21. If so, the second action is preferred, and control jumps to step S2235. Otherwise, the first action is preferred, and control jumps to step S2230.

In step S2275, the distance D21 is also checked to determine if it is infinite. If the distance D21 also is infinite, control continues to step S2280. Otherwise, if the distance D12 is not infinite, the first action is preferred, and control jumps to step S2230.

In step S2280, the dependency action system is checked to determine if the first and second actions share a common disabling storage location. If the first and second actions do not share a common disabling storage location, control continues to step S2285. In step S2285, the distances D1 and D2 are compared to determine if D1 is less than D2. If so, the first action is preferred, and control jumps to step S2230. Otherwise, the second action is preferred, and control jumps to step S2235.

If the first and second actions share a common disabling storage location, control jumps to step S2290. Similarly to step S2285, in step S2290, the distances D1 and D2 are compared to determine if D1 is less than D2. If so, the second action is preferred, and control jumps to step S2235. Otherwise, the first action is preferred, and control jumps to step S2230.

Figure 17:
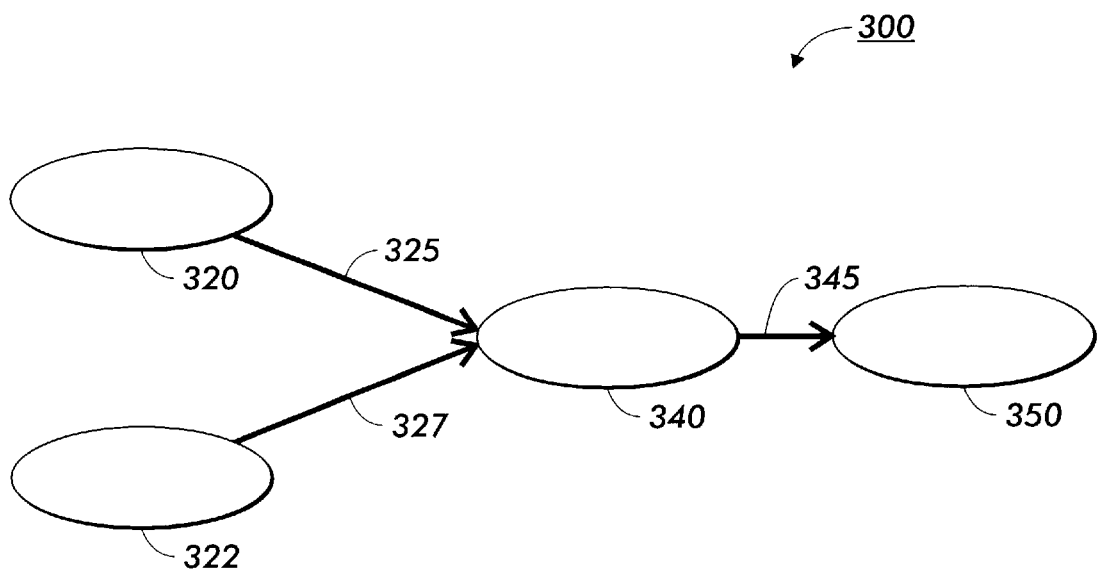
FIG. 17 is the directed graph constructed according to the method outlined in FIG. 15 corresponding to the dependency action system shown in FIG. 4.

FIG. 17 illustrates a directed graph 300 generated from the dependency action system 200 shown in FIG. 4. The actions 220, 222 and 240 of FIG. 4 correspond to the nodes 320, 322 and 340, respectively, of the directed graph 300 shown in FIG. 17. The node 350 is a new STOP node. These nodes are connected by arrowed graph lines, i.e., the "edges". An edge exists under two conditions: 1) when a storage location "connects" one action to another action, i.e., the storage location is a disabling storage location for one action and is also an enabling storage location for the other action; or 2) when an action produces a value for an output storage location. In that case, there is an edge from the node corresponding to that action to the STOP node. The lengths, or "weights", of the edges are defined as the ratio of the cost of an action to the probability that the action modifies either a disabling storage location or an output storage location.

The directed graph 300 shown in FIG. 17 is constructed according to the method outlined in FIG. 15 for the exemplary dependency action system 200 shown in FIG. 4. For each of the actions 220, 222 and 224 of FIG. 4, the respective associated nodes 320, 322 and 340 are constructed according to step S1815. The new STOP node is constructed according to step S1820. An edge 235 from the node 320 to the node 340 is constructed according to step S1870. This edge is constructed because the storage location 232 is a disabling storage location for the action 220 associated with the node 320 and is an enabling storage location for the action 240 associated with the node 340. Similarly, an edge 327 from the node 322 to the node 340 is constructed according to step S1870. This edge is constructed because the storage location 232 is a disabling storage location for the action 222 associated with the node 320 and is an enabling storage location for the action 240 associated with the node 340. Finally, an edge 345 from the node 340 to the STOP node 350 is constructed according to step S1850. This edge is constructed because the output storage location 250 is a disabling storage location for the action 240 associated with the node 340.

In general, the graph constructed according to the method outlined in FIG. 15 contains an edge from a first node to a second node if the execution of the action associated with the first node can change the storage locations such that the action associated with the second node is enabled. There is an edge from a first node to the STOP node if the execution of the action associated with the first node can update the output storage location.

The method for determining the preferred action outlined in FIG. 16 can be summarized as:

1) an eager action should always be preferred over a lazy one;
2) if both actions are lazy, prefer the one with the shortest distance to the final node;
3) if both actions are eager:
   a) for actions that are associated with nodes that are on an enabled-action-cycle, one action is preferred over the other action if the distance from the one action to the other action is smaller than the distance from the other action to the one action;
   b) for actions that are associated with nodes that are not on an enabled-action-cycle but one is reachable from the other, prefer the one action that is reachable from the other;
   c) if there is no path between the nodes associated with the two actions but the actions share a common disabling storage location, prefer the action associated with the node with the smaller distance from the final node; and
   d) otherwise, prefer the action associated with the node with the greatest distance from the final node.

The enabled action preference policy is based on the probability that the execution of an enabled action will update one of its disabling storage locations. By repeatedly executing a dependency action system with different input data, it is possible to determine probabilities $Q(a_j, s_i)$ that an action updates storage location S. A cost is associated with each action $a_j$. Depending on the application, different cost measures, such as time, space, or quality, may be appropriate. Cost data can be determined either by observing the system behavior or through other methods. The probability $Q(a_j, s_j)$ is used in steps S1855 and S1875 to define the weight of the edge between nodes representing the enabled actions $a_i$, $a_j$ in a directed graph, where $a_j$ is an action subsequently enabled by $s_j$.

The modification probabilities associated with an action are the probabilities that execution of the action will modify some of the storage locations associated with the action. Updating the cost and modification probabilities associated with each action further includes determining whether a change in the updated cost and modification probabilities associated with an action meets predetermined criteria, and calculating a new preference relation based on the updated cost and modification probabilities if the change meets the predetermined criteria.

FIG. 18 is a flowchart outlining the method for dynamically updating the dependency action system execution. It should be appreciated that operation of the dependency action system, as outlined in FIGS. 10–12, and the dynamic updating of the dependency action system outlined in FIG. 18, execute concurrently. The method begins in step S3000, and continues to step S3100, where the dependency action system is checked to determine if an input provided by the user or one or more changes provided by other systems has occurred. When such an input or change is detected, control continues to step S3200. Otherwise, control returns to step S3100.

In step S3200, the execution of the dependency action system is interrupted. In step S3200, the operation of the dependency action system is interruptible at any point in the during its execution to allow the parameters or the enabled action preference policy to be updated or to change probabilities or costs associated with the dependency action system. Then, in step S3300, the user or other input or the changes to the dependency action system is made to the dependency action system.

In step S3400, the detected input is checked to determine if the change to the dependency action system is data input by the user or some other data input. If so, control continues to step S3500. Otherwise, control jumps directly to step S3600. In step S3500, the input data is stored in the appropriate storage location and the set of enabled and/or disabled actions is updated. Control then continues to step S3600.

In step S3600, the detected changes are checked to determine if they require the enabled action preference policy to be updated. If so, control continues to step S3700. Otherwise, control jumps to step S3800. In step S3700, the enabled action preference policy is updated according to steps S1700–S2400 outlined above with respect to FIGS. 14–16. Control then continues to step S3800.

In step S3800, the operation of the dependency action system is resumed at the point it was interrupted. However, the further operation of the dependency action system is based on the updating done in steps S3500 and S3700. Control then returns to step S3100, where the dynamic updating procedure waits until another user input or other change is detected.

In step S3500, the parameters of the dependency action system can be initially input into the system or updated while the system is running. In the preferred embodiment, at least stored actions, dependencies between storage locations and actions, initial storage location values, storage location attributes, modification probabilities, described below, and initial cost values are initially input into the system and can be updated while the dependency action system is running. However, while storage locations can be added at any time, only unused storage locations can be deleted.

Table I shows the cost and the eager/lazy characterization associated with the actions of FIG. 11, and Table II shows the modification probabilities associated with the actions of FIG. 11. The test actions 1020 and 1026 each have a 50/50 chance of terminating. The computation actions 1022 and 1024 will never fail, because they always modify their target storage location. As shown in Table II, for example, the probability that the test action 1020 (XL) will change the value of the storage location 1030 (FALSEX) is 50%, and the probability that the test action 1022 (XL) will change the value of storage location 1032 (TRUEX) is 50%.

FIG. 19 shows the graph constructed according to FIGS. 14 and 15. It illustrates the probability and cost relationships between the actions of FIG. 11, based on the values outlined in Tables I and II. In this example, based on the costs and probabilities set forth in Tables I and II, all weights (lengths) between the nodes are 1.

Table III shows the minimum distance, expressed as a length, or weight, between nodes corresponding to the nodes shown in FIG. 19. As shown in Table III, the length of a path from the test action 1020 (XL) to the computation action 1022 (XD) is determined to be the sum of the lengths of a path from the test action 1020 (XL) to the computation action 1024 (YD), plus the length of a path from the computation action 1024 (YD) to the test action 1026 (YL), plus the length of a path from the test action 1026 (YL) to the computation action 1022 (XD), for a total length of 3. This corresponds to the value at the intersection of the row containing XL and the column containing XD in Table III. The path lengths for all other pairs are determined in the same way. However, in Table III, a length of ∞ means that the combination cannot be obtained.

Table IV is a table showing the preference relation for the dependency action system of FIG. 11, determined according to FIG. 16 for each pair of the actions 1020 (XL), 1022 (XD), 1024 (YD), 1026 (YL), 1040 (SO). The table specifies which action is to be preferred. XD is preferred over XL because of rule 3a. YD is preferred over XL because of rule 3d, because the distance from DY to SL equals the distance from SL to DX and rule 3a does not apply. XL, XD, YD and YL are preferred over SO because of rule 3d. By the above rules, selection of the actions YD and XD and selection of the actions YL and XL is random.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

TABLE I

| Name | Function | Cost | Eager |
|------|----------|------|-------|
| XL | X < Y? | 0.5 | yes |
| YL | Y < X? | 0.5 | yes |
| DX | X = X − Y | 1 | yes |
| DY | Y = Y − X | 1 | yes |
| SO | Out = X | 1 | yes |

Cost and eager/lazy characterization of the example shown in FIG. 17.

TABLE II

| Probability Function | Value |
|----------------------|-------|
| Q(XL, FalseX) | 0.5 |
| Q(XL, TrueX) | 0.5 |
| Q(YL, FalseY) | 0.5 |
| Q(YL, TrueY) | 0.5 |
| Q(DX, X) | 1.0 |
| Q(DY, Y) | 1.0 |
| Q(SO, Out) | 1.0 |

The probability an action will modify a storage location of the example shown in FIG. 17.

TABLE III

|    | XL | XD | YD | YL | SO | ⊥ |
|----|----|----|----|----|----|----|
| XL |    | 3  | 1  | 2  | 2  | 3 |
| XD | 1  |    | 2  | 1  | 1  | 2 |
| YD | 1  | 2  |    | 1  | 1  | 2 |
| YL | 2  | 1  | 3  |    | 2  | 3 |
| SO | ∞  | ∞  | ∞  | ∞  |    | 1 |

The minimum distance between nodes corresponding to the actions in shown FIG. 17

TABLE IV

|    | XL | XD | YD | YL | SO |
|----|----|----|----|----|----|
| XL |    |    |    |    |    |
| XD | XD |    |    |    |    |
| YD | YD |    |    |    |    |
| YL |    | XD | YD |    | -. |
| SO | XL | XD | YD | YL |    |

Reasons for selecting the preferred actions shown in FIG. 17.

What is claimed is:

1. A method for executing a software system, the software system comprising:
   a set of storage locations, each storage location having a storage value and at least one associated attribute value;
   a plurality of actions, each action having at least two of the plurality of storage locations associated with that action; and
   a selection rule;
the method comprising:
   determining a set of enabled actions based on the associated attribute values for the at least two storage locations associated with each action;
   selecting an enabled action from the set of enabled actions based on the selection rule;
   executing the selected enabled action; and
   updating the storage value and the at least one associated attribute value for at least one of the storage locations associated with the selected enabled action based on a result of the execution of the selected enabled action.

2. The method of claim 1, wherein the plurality of actions can be dynamically redefined substantially at any time during execution of the software system.

3. The method of claim 1, wherein the set of storage locations can be dynamically redefined substantially at any time during execution of the software system.

4. The method of claim 1, wherein the storage locations can be dynamically reassociated with the actions substantially at any time during execution of the software system.

5. The method of claim 1, further comprising generating at least one output value from the plurality of storage locations.

6. The method of claim 5, wherein generating the at least one output value comprises outputting the at least one output value or generating a communication.

7. The method of claim 1, further comprising updating cost and modification probabilities associated with each action.

8. The method of claim 7, where the cost and modification probabilities can be dynamically updated substantially at any time during the operation of the method.

9. The method of claim 8, where modification probabilities associated with an action are the probabilities that execution of the action will modify some of the storage locations associated with the action.

10. The method of claim 8, wherein updating cost and modification probabilities comprises:
   determining whether a change in updated cost and modification probabilities associated with an action meets predetermined criteria; and
   adjusting the selection rule based on the updated cost and modification probabilities if the change meets the predetermined criteria.

11. The method of claim 1, wherein determining the set of enabled actions comprises determining, for each action and for each at least one enabling storage location and each at least one disabling storage location for that action, whether all such enabling storage locations are initialized and whether the at least one enabling storage location associated with that action has an attribute value greater than the attribute value of all disabling storage locations associated with that action.

12. The method of claim 11, wherein an action is enabled if all of its enabling storage locations are initialized and none of its disabling storage locations are initialized.

13. The method of claim 1, wherein the attribute value is a time-stamp having a value, and determining a set of enabled actions further comprises identifying an action as enabled according to the relative time-stamp values of designated enabling and disabling storage locations associated with the action.

14. The method of claim 1, wherein the attribute value is a computation-stamp having a value, and determining a set of enabled actions further comprises identifying an action as enabled according to the relative computation-stamp values of designated enabling and disabling storage locations associated with the action.

15. The method of claim 1, wherein the selection rule is a preference relation.

16. The method of claim 1, wherein the selection rule is usable to select one of a plurality of enabled actions.

17. A dependency action system, comprising:
   a set of storage locations, each storage location having a storage value and at least one associated attribute value;
   a plurality of actions; wherein, for each action, at least two of the plurality of storage locations are associated with that action;
   a selection rule; and
   an enabled action selector that selects an enabled action from a set of enabled actions based on the selection rule;
wherein:
   an action is enabled based on the at least one associated attribute value for the at least two storage locations associated with that action; and
   the selected enabled action executes upon being selected and the storage value and the associated attribute value for at least one of the storage locations associated with the selected enabled action is updated based on a result of the execution of the selected enabled action.

18. The dependency action system of claim 17, wherein the plurality of actions are dynamically updated substantially at any time during operation of the dependency action system.

19. The dependency action system of claim 17, wherein the set of storage locations are dynamically updated substantially at any time during operation of the dependency action system.

20. The dependency action system of claim 17, wherein the storage locations associated with at least one of the actions are dynamically updated substantially at any time during operation of the dependency action system.

21. The dependency action system of claim 17, further comprises an output device that outputs at least one output value from the plurality of storage locations.

22. The dependency action system of claim 17, further comprises means for updating cost and modification probabilities associated with each action.

23. The dependency action system of claim 22, where the means for updating the cost and modification probabilities operates dynamically substantially at any time during operation of the dependency action system.

24. The dependency action system of claim 23, where the modification probabilities associated with an action are the probabilities that execution of the action will modify at least one of the storage locations associated with the action.

25. The dependency action system of claim 23, wherein the means for updating the cost and modification probabilities comprises:

means for determining whether a change in updated cost and modification probabilities associated with an action meets predetermined criteria; and means for determining a new selection rule based on the updated cost and modification probabilities if the change meets the predetermined criteria.

26. The dependency action system of claim 17, wherein the selection rule is usable to select one of a plurality of enabled actions.

27. A method for constructing a software system, comprising:

defining a plurality of actions;

defining a set of storage locations, each storage location having a storage value and at least one associated attribute value;

associating, for each action, at least two of the plurality of storage locations with that action; and generating a selection rule.

28. The method of claim 27, wherein the attribute value is a time-stamp representing a time when the storage location was last updated.

29. The method of claim 27, wherein the attribute value is a computation-stamp representing whether the storage location has been updated subsequent to a data value being input to the software system.

30. The method of claim 27, wherein associating, for each action, at least two of the plurality of storage locations with that action comprises:

associating at least one of the at least two storage locations as an enabling storage location for that action; and associating at least one of the at least two storage locations as a disabling storage location for that action.

31. The method of claim 27, wherein generating the selection rule comprises generating a preference relation.

32. The method of claim 31, wherein generating the preference relation comprises:

generating a directed graph from the plurality of actions and the associated storage locations;

determining, for each pair of the plurality of actions, which one of the pair of actions is preferred over the other of the pair of actions; and recording the preference in the preference relation.

33. The method of claim 27, wherein generating the selection rule comprises generating a selection rule usable to select one of a number of enabled actions of the plurality of actions.

* * * * *